Jan. 16, 1934.  W. D. FOSTER ET AL  1,944,024
PHOTOGRAPHIC APPARATUS
Filed April 28, 1926   13 Sheets-Sheet 1

INVENTORS

Jan. 16, 1934.  W. D. FOSTER ET AL  1,944,024
PHOTOGRAPHIC APPARATUS
Filed April 28, 1926  13 Sheets-Sheet 2

Jan. 16, 1934.   W. D. FOSTER ET AL   1,944,024
PHOTOGRAPHIC APPARATUS
Filed April 28, 1926   13 Sheets-Sheet 3

INVENTORS
Warren Dunham Foster,
Carle L. Parmelee,
By Byrnes, Stebbins & Parmelee
their attys.

Jan. 16, 1934.  W. D. FOSTER ET AL  1,944,024
PHOTOGRAPHIC APPARATUS
Filed April 28, 1926  13 Sheets-Sheet 4

INVENTORS
Warren Dunham Foster,
Curle L. Parmelee,
Byrnes, Stebbins Parmelee,
their atty.

Jan. 16, 1934.  W. D. FOSTER ET AL  1,944,024
PHOTOGRAPHIC APPARATUS
Filed April 28, 1926   13 Sheets-Sheet 5

INVENTORS

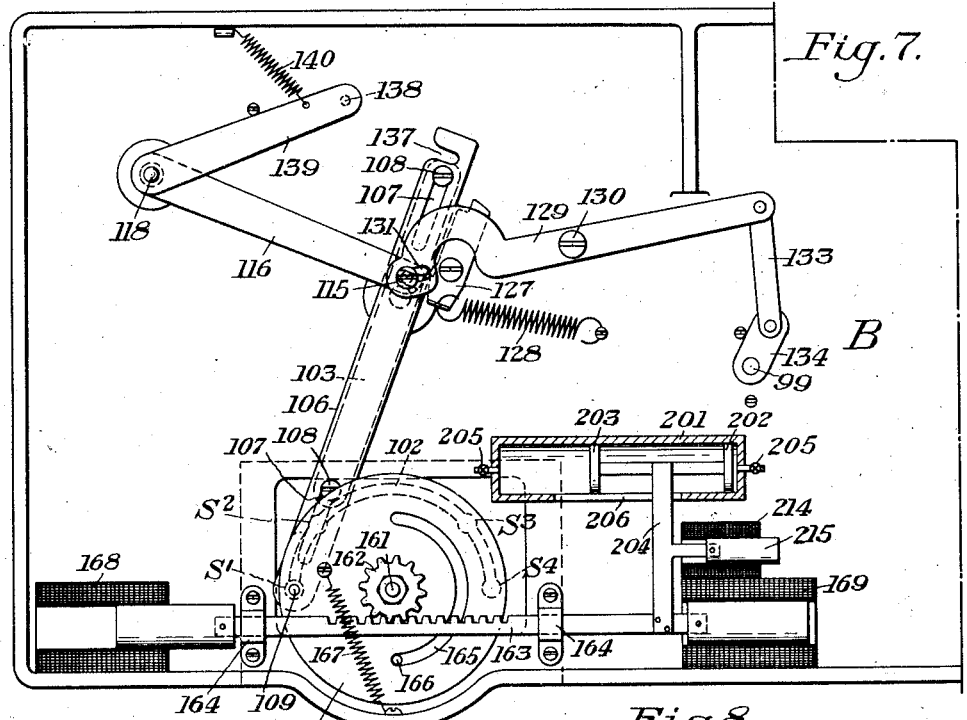
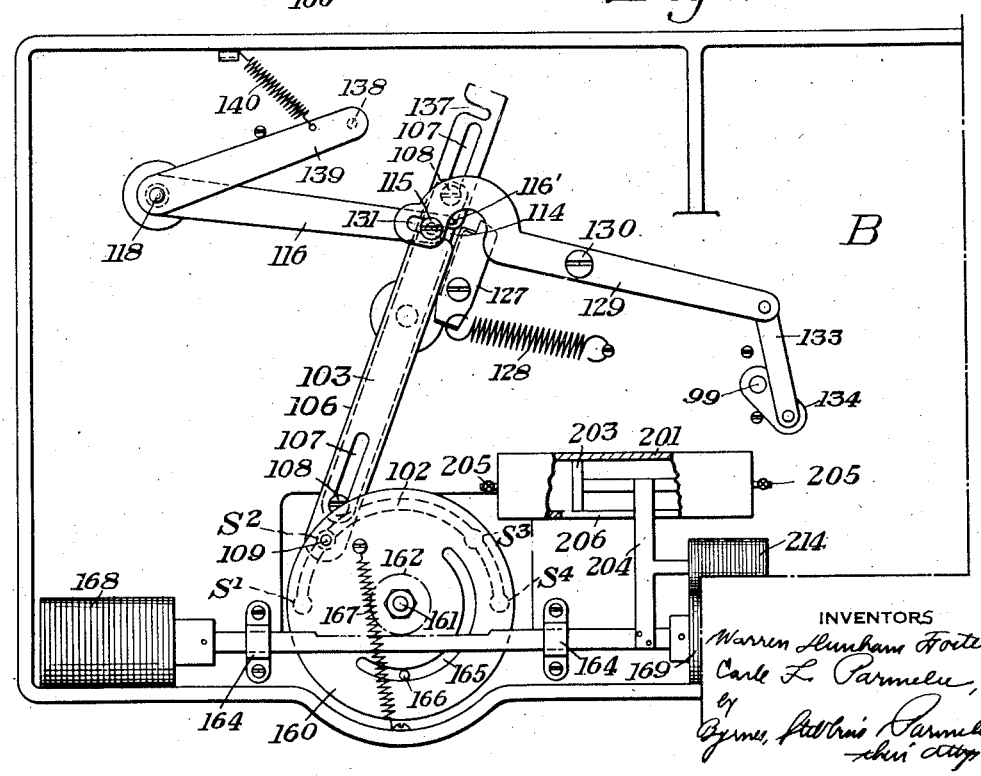

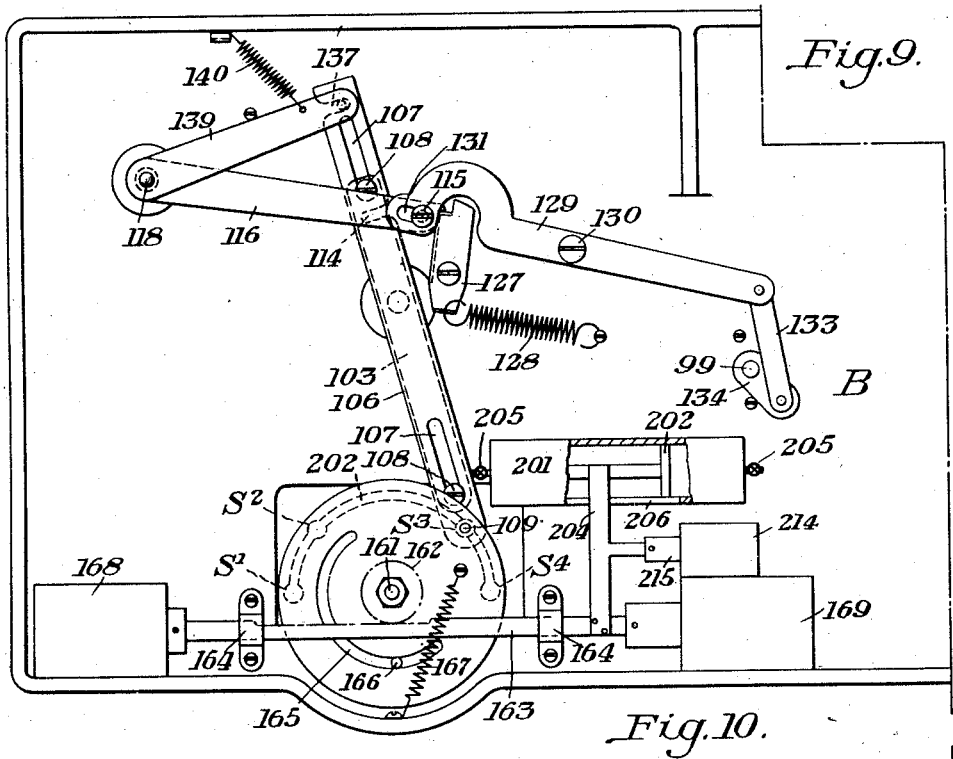
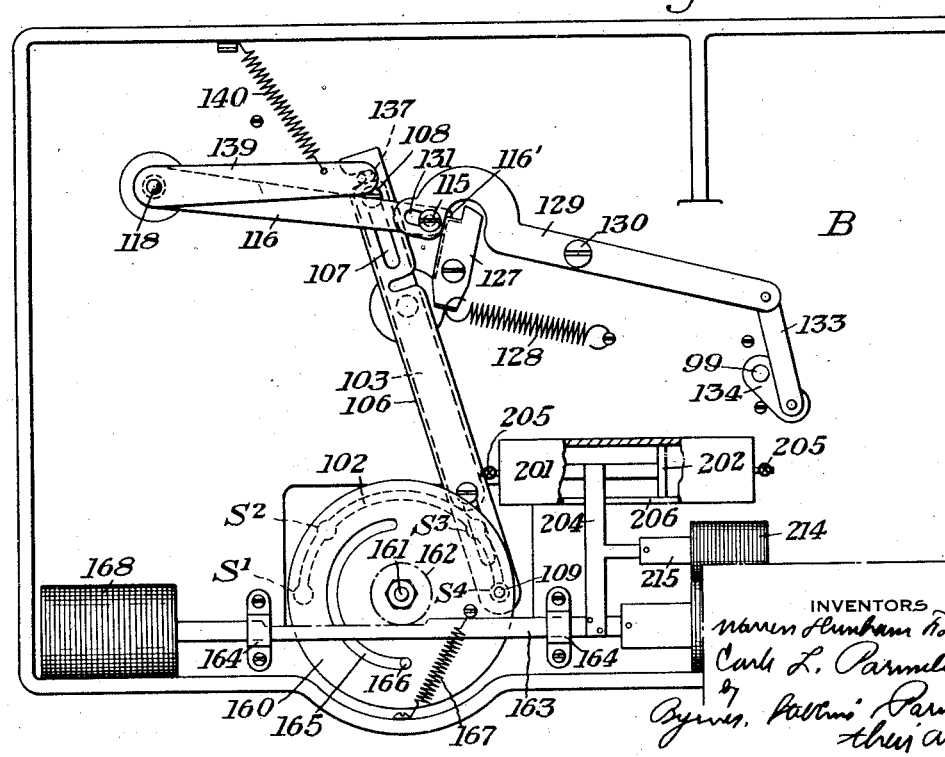

Jan. 16, 1934.    W. D. FOSTER ET AL    1,944,024
PHOTOGRAPHIC APPARATUS
Filed April 28, 1926    13 Sheets-Sheet 8

INVENTORS
Warren Abraham Foster,
Carl L. Parmelee,
by Byrnes, Stebbins & Parmelee
their attys.

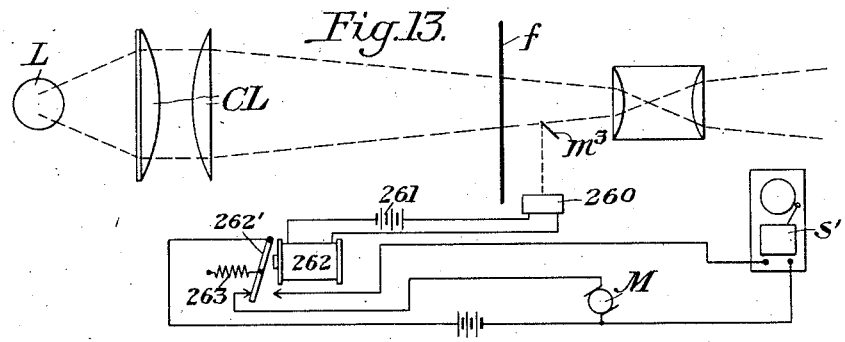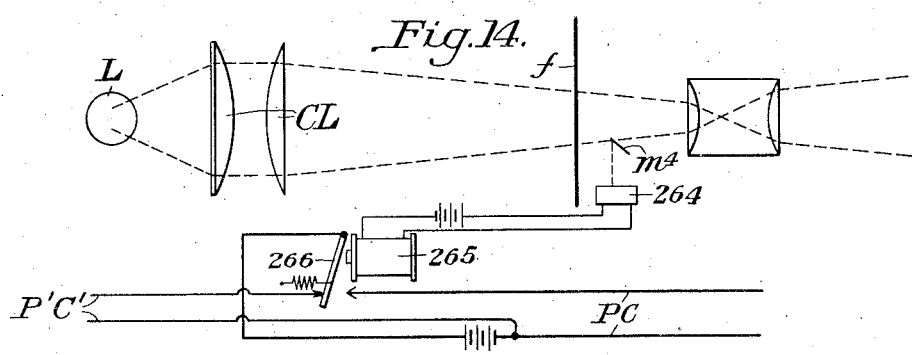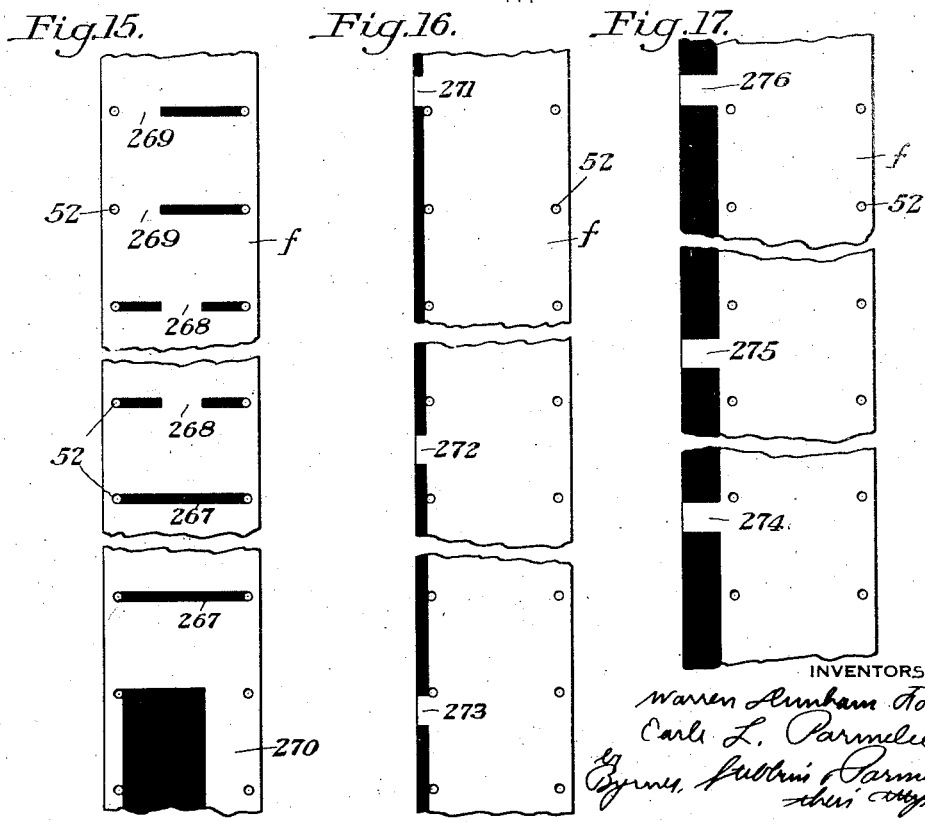

Jan. 16, 1934.   W. D. FOSTER ET AL   1,944,024
PHOTOGRAPHIC APPARATUS
Filed April 28, 1926   13 Sheets-Sheet 10

INVENTORS
Warren Abraham Foster,
Carl L. Parmelee,
by Byron Stebbins Parmelee,
their attys.

Jan. 16, 1934.    W. D. FOSTER ET AL    1,944,024
PHOTOGRAPHIC APPARATUS
Filed April 28, 1926    13 Sheets-Sheet 11
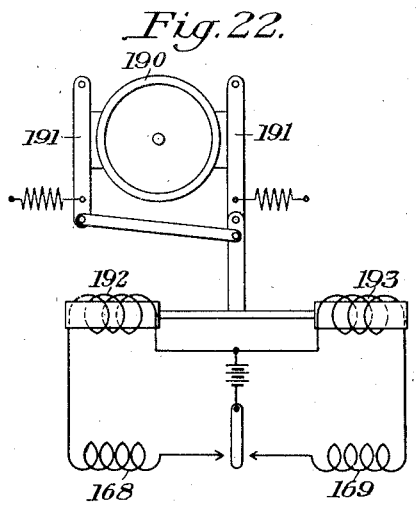
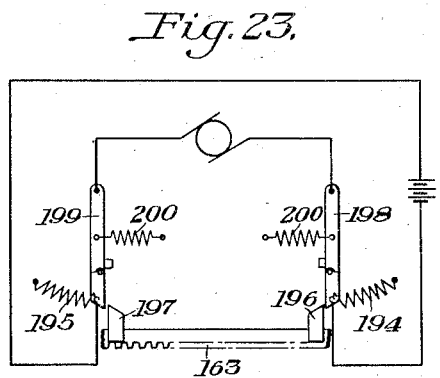
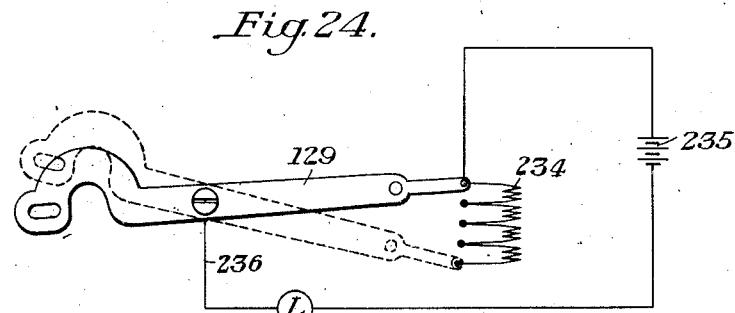
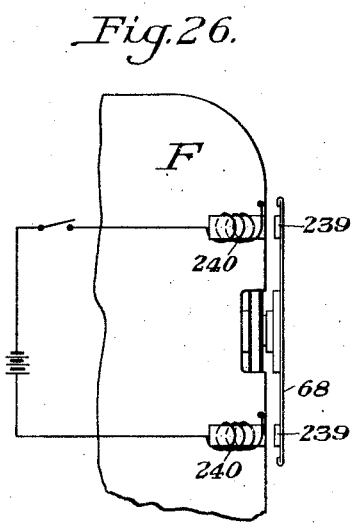
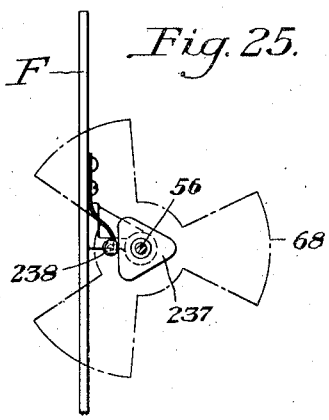
INVENTORS
Warren Hinkham Foster,
Carle L. Parmelee,
by Byrnes, Stebbins & Parmelee
their attys.

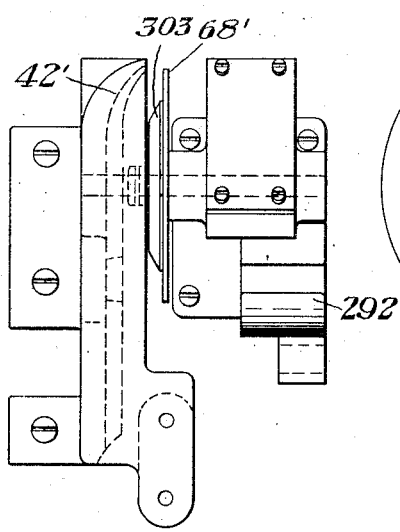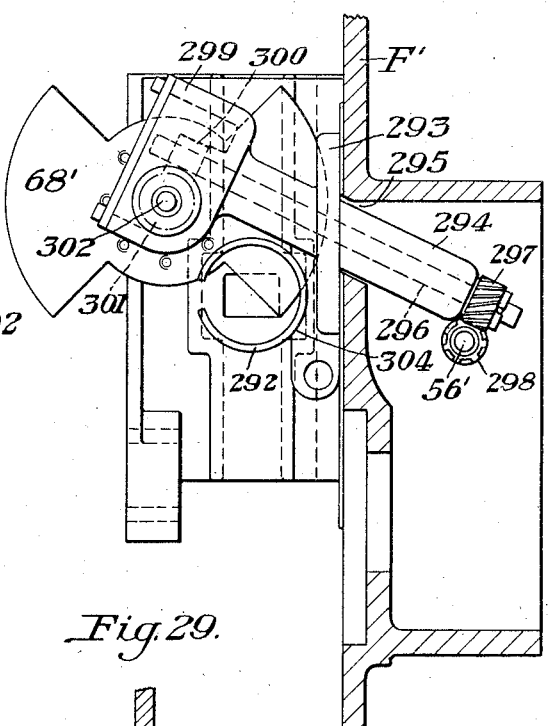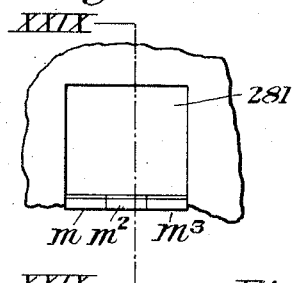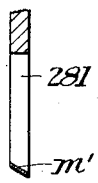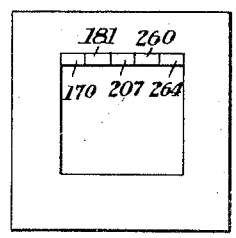

Jan. 16, 1934.   W. D. FOSTER ET AL   1,944,024
PHOTOGRAPHIC APPARATUS
Filed April 28, 1926   13 Sheets-Sheet 13

INVENTORS
Warren Dunham Foster,
Carle L. Parmelee,
Byrnes, Stebbins & Parmelee,
their attys.

Patented Jan. 16, 1934

1,944,024

UNITED STATES PATENT OFFICE 1,944,024

PHOTOGRAPHIC APPARATUS

Warren Dunham Foster, Washington Township, Bergen County, N. J., and Earle L. Parmelee, Pittsburgh, Pa., assignors, by direct and mesne assignments, to Kinatome Patents Corporation, New York, N. Y., a corporation of New York Application April 28, 1926. Serial No. 105,159

144 Claims. (Cl. 88—17)

The present invention relates particularly to the art of photographic apparatus, the term "photographic" herein being used generically as definitive not only of apparatus frequently designated as "cameras" or by a similar name, but also of apparatus usually generically referred to as "motion picture taking or projecting apparatus" as well as to stereopticon apparatus. The invention has special utility, however, with respect to the projection of pictures in motion, such as required for amusement, educational or advertising purposes. The utility of the invention is, however, not limited in this respect, it being equally well adapted for general use by either skilled or unskilled operators for the projection of pictures either in motion or as so-called "still" pictures.

At the present time, considerable attention is being devoted to the construction of apparatus capable of being utilized for the repetition display of motion pictures from a strip of film. By reason, however, of the fragile character of the film which must be used, and the difficulties of effecting reversal of its direction of travel, or rewinding of an exposed length, such apparatus has heretofore required not only a great deal of operating attention, but also frequent renewal of films or repair thereof.

Efforts have also been made to effect continuous film travel in the same direction by securing the ends of the film together and providing some means for attempting to adequately take care of the main body of the film while the remaining comparatively short portion of the film has been passing through the gate. Considerable difficulty has, however, been experienced in this type of apparatus and its use has been necessarily limited.

In the copending application of Warren Dunham Foster, Serial No. 57,392, filed September 19, 1925, there is disclosed and claimed an improved form of apparatus of the general nature adaptable, for example, in accordance with the present invention. In that application, the operation of the apparatus with relation to the direction of movement of the film, the speed of movement of the film, or the character of movement of the film is controlled automatically by the film itself, preferably through the agency of electrically operated devices having circuits energized or deenergized by the film itself during the travel thereof. Apparatus of such character has been found to be extremely desirable, due to the rapidity of control which may be obtained and the effectiveness of such control. In many cases, however, it may be desirable or necessary, due either to the particular construction of the apparatus being utilized, the construction or nature of the film or for other reasons, to provide means for controlling the film, as already set forth, without the necessity of providing electrical circuits directly energized or deenergized by the film, and without the necessity of burdening the film itself with any extra duties; or providing it with especial attachments, notches or specially constructed portions for the purpose of effecting any desired electrical operation directly.

The present application has for certain of its objects the provision of mechanism whereby the film is utilized for directly controlling its direction, speed and character of movement entirely by reason of the character or intensity of light transmitted by any predetermined portion or portions thereof.

The invention has for other of its objects the provision of apparatus responsive to the film itself for giving a visual, audible or other signaling indication as to the proper time of commencement or cessation of operations associated with the main operation, and also for directly controlling such associated operation. An associated operation of the character herein contemplated may comprise the control of a radio receiving or transmitting apparatus, phonographic or other sound producing apparatus or the like, the lighting of the room in which the apparatus is being utilized, the illumination or darkening of advertising announcements or other signs, or their mechanical display or manipulation. Other examples will at once suggest themselves to those skilled in the art. The advantages of the invention in this respect are greatly enhanced by the fact that it provides a simple means, definitely and automatically controlled by the light from or through the film itself, whereby these associated operations or any desired number of them, may be conducted in any preordained timed relationship as the operation may determine in advance, and without any attention thereafter.

Still further objects of the present invention are to provide a system of control responsive to variations in the character or intensity of the light for effecting cessation of operation of the apparatus, in the event of film breakage or failure of light source and for the automatic re-commencement of such operation when the film is in normal condition or the light source re-established.

The present invention further contemplates a control of the general character herein referred to, which may be utilized either alone or in combination with a manual control or thrown entirely out of operation at the will of the operator.

The present invention has for still other of its objects the utilization of means for obtaining desirable results with respect to the obtaining of a period of dwell between periods of normal feed, as required for projection and rewinding purposes, as well as the control of this period whereby it may be variably timed in accordance with the type of film being handled whereby it may be long enough to avoid undue strain on even the most delicate films.

The present invention likewise contemplates the control automatically of operations as referred to, without subjecting the motor normally used for projection purposes to any extra load, thereby enabling the use of a motor of maximum power with a minimum current consumption.

Still a further object of the invention is to obtain a control of the character herein contemplated, without subjecting the film itself to extra load or undue strain by reason of such operations.

The present invention is adaptable for use with films of the character having one or both ends secured to different carriers by means of lengths of shock resisting, fire-resisting or fireproof material, such as asbestos, copper or the like, or of material which can be doubled upon itself or bent at will without injury, whereby the possibility of injury to the film is minimized, although it is equally adaptable to films in which such lengths of connecting material are entirely omitted.

Still another object of the invention is to provide mechanism under the control of the light passing through the film for changing the character of projection automatically at predetermined times, from so called projection in motion to stereopticon or still projection. Such an operation is particularly desirable, for example, in displaying titles, legends or the like, as it enables the amount of stock usually devoted to such data to be greatly diminished.

The construction herein contemplated makes it possible to use both the same projecting machine and the same film for the showing automatically of a series of still or stereopticon pictures, and pictures in motion. Previously to this invention, and to the one disclosed and claimed in the co-pending application of Warren Dunham Foster, Serial No. 57,392, filed September 19, 1925, it has been necessary for exhibitors who wish to avail themselves of the advantages of both automatic stereopticon and automatic motion picture projection, either to use two different sets of apparatus, or go to the almost prohibitive expense of printing many "frames" of the same picture, such frames to be displayed in motion, but to give the same results as one frame alone, displayed as by the apparatus herein described.

A further object of the invention is to provide means under the control of the light transmitted by the film itself operative to diminish the speed of the feeding mechanism or of the engagement of such mechanism with the film, whereby the film is protected during such periods as have heretofore represented the periods of hardest usage.

Still another advantage of the present invention resides in the provision of a device for automatically reducing the amount of current reaching the light source, and consequently the heat falling upon the film at such times as the film is stationary, or is being utilized for the projection of so-called still or stereopticon pictures. That is, at those times when the film is moving below a predetermined speed, or is at rest, and would consequently be endangered if full light and heat fell upon it, the current is so reduced that this danger is obviated. Moreover, this feature of the invention is so arranged that the amount of current reaching the lamp when the apparatus is being placed in operation, is much reduced, whereby the filament gradually heats and the life of the lamp is thereby correspondingly increased. In other projectors, this result is accomplished by the provision of a supplemental variable rheostat, often in addition to a heat screen of suitable construction. Frequently, both of these must be manipulated by hand, thereby adding both another item of expense and source of trouble, particularly to the amateur operator.

A still further object of the invention is to provide an apparatus of the general construction referred to in which the motor may be automatically stopped upon the happening of certain conditions, and the cessation of motor operation in turn utilized to effect or control certain desired operations.

In the accompanying drawings, there are shown for purposes of illustration only certain embodiments of the present invention. The drawings with respect to the character of the projecting apparatus and the type of control are illustrative only, it being obvious that changes in the construction, operation and manner of control may be made without departing from either the spirit of our invention or the scope of our broader claims.

In the drawings:

Figure 7 is a partial bottom plan view showing actuating levers "in normal intermittent projection" position;

Figure 8 is a partial bottom plan view showing actuating levers in "still projection" position;

Figure 9 is a partial bottom plan view showing actuating levers in "film threading or changing" position;

Figure 10 is a partial bottom plan view showing actuating levers in "rewind" position;

Figure 13 is a view similar to Figure 12, illustrating a similar control operable in the event of breakage of the film;

Figure 14 is a diagrammatic view illustrating a form of control effective for signaling or actually effecting the initiation or cessation of an incidental operation;

Figure 15 is a detail view on an enlarged scale of a portion of a film, illustrating one manner in which any of the controls herein referred to may be obtained, such control being effected by specially treating the film in the space usually provided between adjacent pictures;

Figure 16 is a view similar to Figure 15, showing the manner of obtaining similar results by a special edge marking of the film;

Figure 17 is a view similar to Figures 15 and 16, illustrating still another form of film marking operative in accordance with the present invention;

Figure 11:
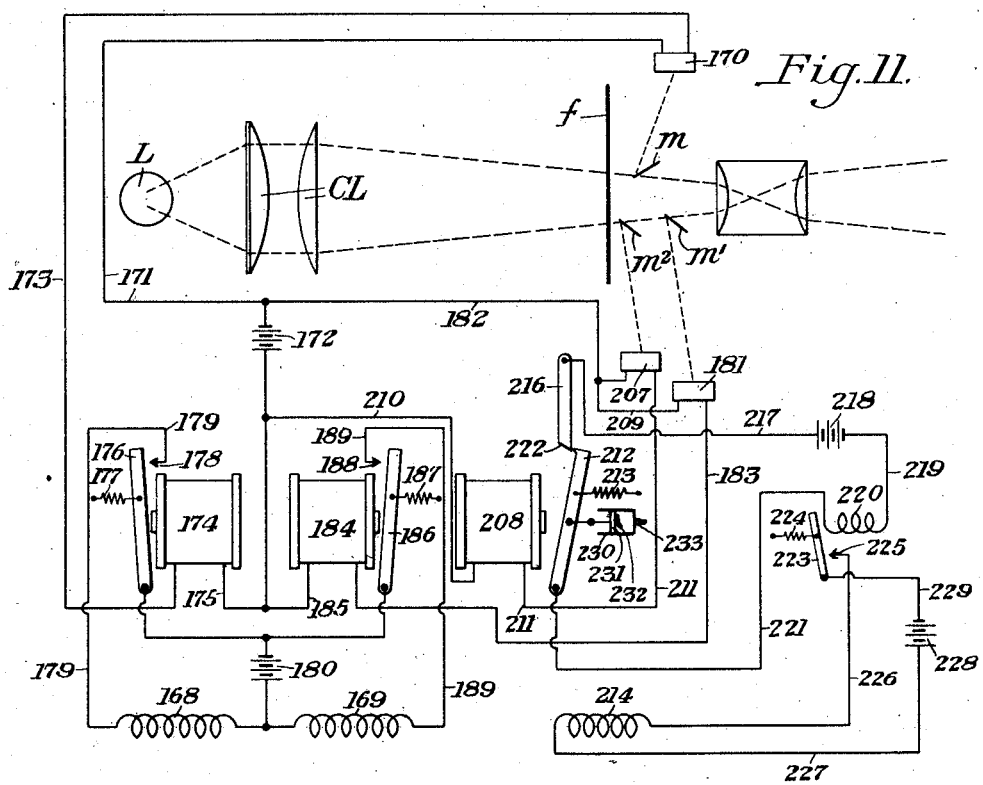
Figure 11 is a diagrammatic view illustrating one form of controlling circuit which may be utilized in accordance with the present invention.
Figure 20:
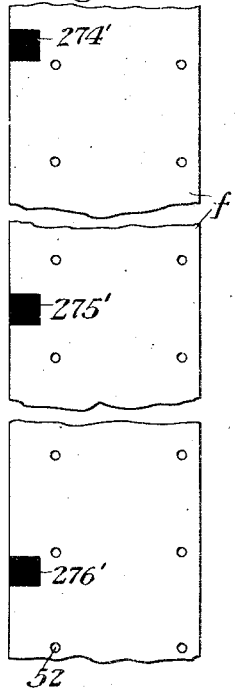
Figure 20:
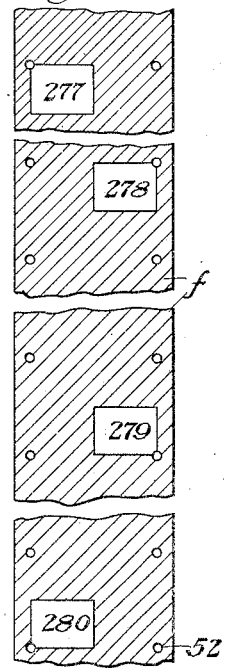
Figure 21:
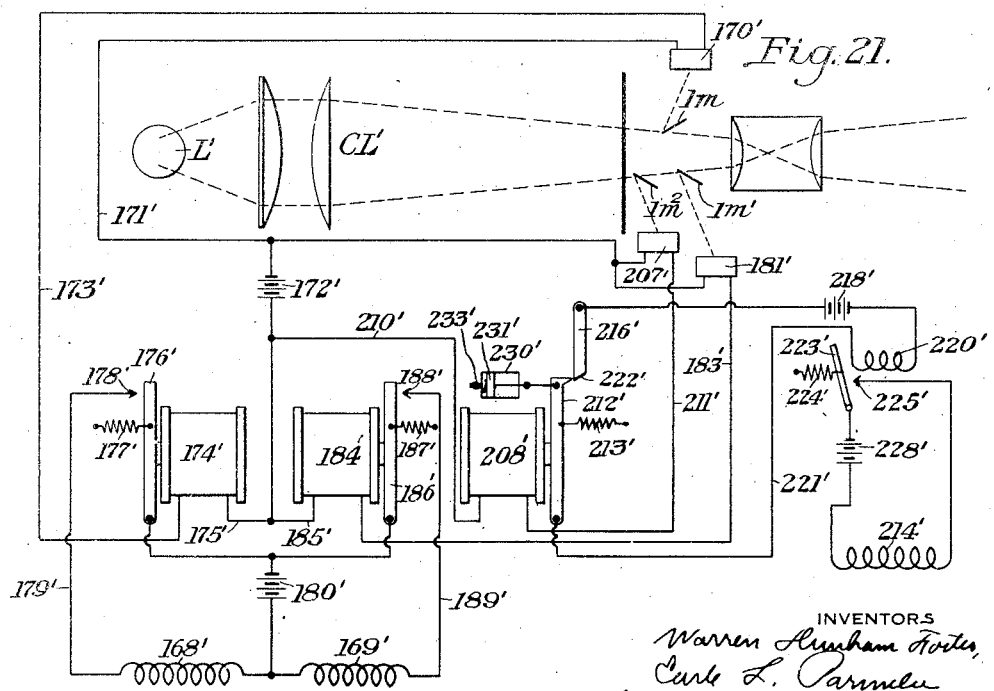
Figure 31:
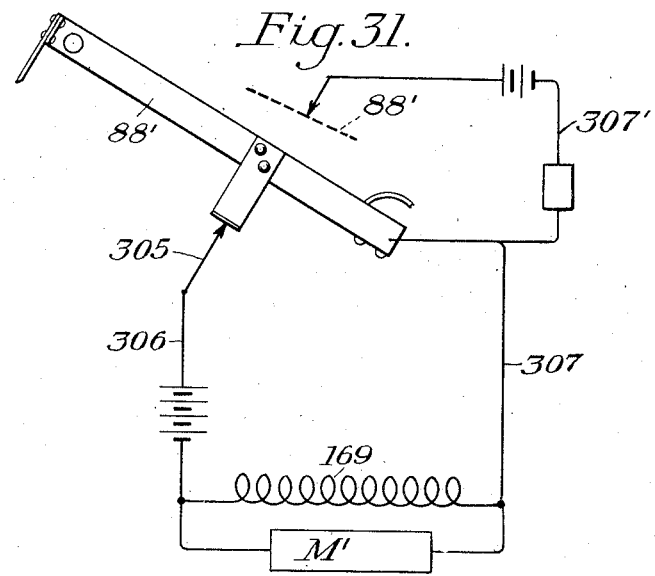
Figure 32:
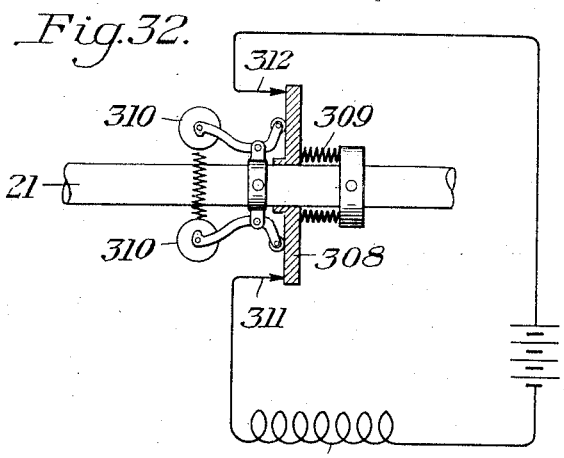

Figure 20' illustrates still another type of film;

Figure 21 illustrates diagrammatically a form of controlling circuit similar to that of Figure 11, but in which the light sensitive elements are normally subjected to light;

Figure 22 is a diagrammatic view illustrating one form of control in which the speed of the feeding mechanism is automatically reduced by means of a brake;

Figure 23 is a view similar to Figure 22 in which substantially the same results are accomplished by cutting resistance into the motor circuit;

Figure 24 is a view, largely diagrammatic, showing means for varying effective light intensity without the use of a heat shield;

Figures 25 and 26 are diagrammatic views illustrating different forms of mechanisms for insuring the shutter stopping in the desired position for still projection, Figure 25 illustrating a mechanical control and Figure 26 a magnetic control;

Figures 27 and 27' are detail elevational and sectional views respectively of a modified form of shutter positioning;

Figure 28 is a partial front elevational view of a gate showing one form of window or aperture;

Figure 29 is a vertical sectional view on the line XXIX—XXIX of Figure 28;

Figure 30 is a view similar to Figure 28, illustrating a modified form of aperture;

Figure 31 is a diagrammatic view illustrating a modified embodiment of the present invention illustrating one means of control operating under predetermined tension conditions in the film; and Figure 32 is a detail view, largely diagrammatic, illustrating means whereby cessation of operation of the driving motor may be utilized to control certain circuits or produce predetermined results.

In carrying out the present invention there may be provided an apparatus comprising a supporting base B having mounted thereon a lamp and resistance containing housing H and a supporting frame F upon which are mounted the operating parts of the film feeding and controlling mechanism per se.

Preferably carried by the frame F and projecting laterally from one side thereof in predetermined spaced relationship is a pair of reel receiving spindles 2 and 3, the upper spindle 2 being adapted for the holding of a reel of film during the feeding movement thereof and adapted to effect rewinding of the film at the conclusion of the feeding movement, while the lower spindle 3 is adapted to be positively driven simultaneously with the feeding movement for coiling or taking up the film as required.

The film itself is preferably carried in a combined storage and exhibiting protector comprising a pair of containers 4 and 5 having a pivotal connection 6 whereby the containers may be relatively separated to a predetermined extent to expose the desired length of film therebetween. This construction may be substantially as disclosed and claimed in the United States Patent No. 1,440,173, granted December 26, 1922, to Herbert George Ponting and George William Ford, or may be of any other desired construction.

The lower spindle 3, which will hereafter be referred to as the driving spindle, is journaled for rotation in a suitable bearing 7 in the frame F. The back of the frame is formed with an enlarged boss 7ᵃ through which the spindle extends, and beyond the boss there is secured to the spindle a combined brake drum 8 and friction driving member 9. The driving member 9 has a friction surface 10 with which is adapted to cooperate a second friction member 11 in the form of a disk. The disk 11 and the driving member 9 are preferably held in frictional engagement by means of springs 12 carried by the member 9 and bearing against the disk 11 through the medium of an annulus 13, the springs being held under the desired tension and the annulus being maintained in position by adjusting screws 14.

Projecting rearwardly from the disk 11 is a driving lug 15 adapted to be engaged by a clutch hereinafter described in detail by means of which the driving spindle 3 may be frictionally rotated.

Figure 5:
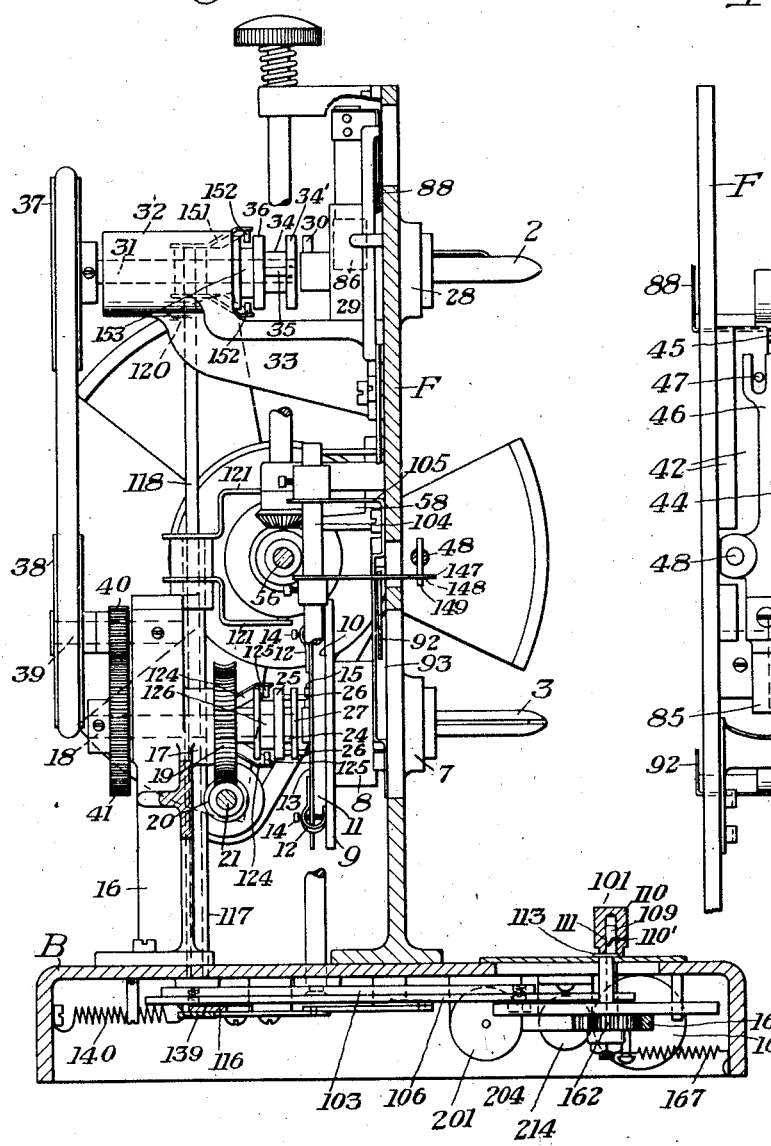
Figure 5 is a cross section on the line V—V of Figure 2 looking in the direction of the arrows.
Figure 6:
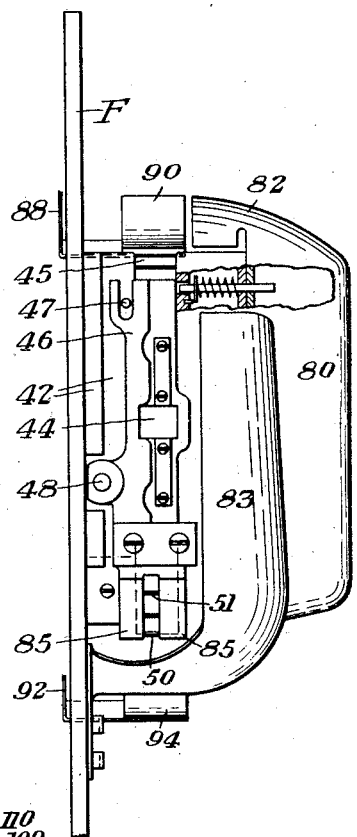
Figure 6 is a partial view taken on the line VI—VI of Figure 1 showing the right side only to illustrate a portion of the gate.

Projecting upwardly from the base B in spaced relation to the frame F is a bearing bracket 16 carrying a bearing 17 for a shaft 18 extending in alignment with the driving spindle 3. Secured in any desired manner to the shaft 18 for rotation therewith is a worm wheel 19 adapted to be driven by a worm 20 secured to a horizontally positioned driving shaft 21 located in the rear of the frame F. This shaft at its forward end is mounted in spaced bearings 22 carried by the bracket 16 and is connected to a driving motor M through a flexible coupling 23 of any desired or usual construction. By reason of this mechanism, it will be apparent that when the motor M is operated the shaft 18 will be positively driven through the worm and wheel before referred to. For transmitting this rotational movement from the shaft 18 to the spindle 3 at will there is provided a sleeve 24 secured in any desired manner to the inner end of the shaft 18 and having slidably mounted thereon a collar 25 from which project pins 26 slidable through the enlarged end 27 of the sleeve 24. By moving the collar 25 to the right as viewed in Figure 5, the pins 26 are projected into the path of travel of the driving lug 15 whereby a drive is positively transmitted to the driving spindle. This clutch will hereinafter be referred to as the driving spindle clutch.

The spindle 2, which will hereinafter be designated the rewinding spindle, is mounted similarly to the driving spindle 3 in a bearing 28 carried by the frame F, and has secured to its rear end a brake drum 29 from which projects a pin or lug 30. Extending in alignment with the rewinding spindle 2 is a shaft 31 suitably journaled in a bearing 32 carried by a bracket 33 illustrated as secured to the frame F. Mounted on the inner end of the shaft 31 is a sleeve 34 having an enlarged end 34' through which project pins 35 carried by a collar 36 and constituting a rewinding clutch similar in construction and operation to the construction of the driving spindle clutch. Upon movement of the collar 36 to the right as viewed in Figure 5, the pins 35 will be brought into the path of travel of the pin or lug 30 whereby the rewinding spindle 2 may be operated for effecting a rewinding of a previously displayed length of film.

For driving the shaft 31, it may conveniently have secured thereto a pulley 37 in line with a similar pulley 38 mounted on the outer end of a stub shaft 39 secured in the bracket 16. Also mounted on the shaft 39 is a spur gear 40 adapted to be driven by a similar, but preferably larger gear 41 on the outer end of the shaft 18. By passing a suitable belt around the pulleys 37 and 38 it will be apparent that the shafts 18 and 31 may be simultaneously rotated by the motor M, the shaft 31 preferably rotating at a higher speed than the shaft 18, and that rotative movement in turn may be imparted by either of these shafts to the respective spindles with which they are in alignment by suitable operation of the controlling clutches.

Mounted on the frame F adjacent the motor M and preferably on the front side of the frame is a gate section 42 preferably secured in any desired manner as by screws 43 against movement relatively to the frame. This section is preferably formed with an aperture 44 through which light may be projected as well understood in the art, and with a film guiding depression 45 extending lengthwise of the section, and intersecting the opening 44, for the travel of the film. Cooperating with the section 42 is a relatively movable section 46 preferably guided by a pin 47 projecting outwardly from the section 42, and secured to one end of a gate opening rod 48 slidable through a suitable opening in the gate section 42 and a suitable bearing 49 on the frame F. By reason of this construction, it will be apparent that when the rod 48 is moved to the left as viewed in Figure 1, it will be effective for moving the section 46 away from the section 42 to permit the removal of a film and the insertion of a new film, while movement in the opposite direction will bring the sections into cooperative relationship.

For effecting the desired intermittent feeding motion of a film in position in the gate, there may be provided a rotatable feeding sprocket 50 having film engaging teeth 51 positioned to engage apertures 52 positioned in the film f, in any desired manner. This sprocket is mounted on a shaft 53 extending transversely through the frame F and carrying at its opposite end a star wheel 54. This star wheel, which may be of any well known construction, is adapted to be intermittently driven by means of a cam 55 secured adjacent one end of a shutter shaft 56 journaled at one end in a grease casing C within which are mounted the cam 55 and star wheel 54, and at its opposite end journaled in a suitable bearing 57 carried by a bracket 58 projecting rearwardly from the frame F.

Mounted loosely on the shaft 56 adjacent the opposite end thereof is a pully 59 adapted to be rendered operative at will by a clutch collar 62. The clutch collar is normally urged in such direction as to be in frictional driving engagement with the pulley 59 by means of a spring 63 abutting at one end against the bottom of a spring receiving recess formed in the collar and at the other end against a shoulder 64 on a spring sleeve 66 secured in any desired manner to the shaft 56 for rotation therewith. Secured to the shaft 56 outside of the pulley 59 is a hub 67 carrying a shutter 68 for operation as well understood in the art. The hub 67 and the shoulder 64 take all of the thrust exerted by the spring 63 whereby the shaft 56 as a whole is relieved from any end thrust.

Secured to the end of the driving shaft 21, and preferably substantially in line with the pulley 59 is a pulley 69 around which may pass a belt 70 for driving the pulley 59 from the drive shaft. By reason of this construction, it will be apparent that with the friction surfaces 60 and 61 in engagement, rotation will be imparted to the shutter shaft 56 from the driving shaft 21, this rotation being effective not only for operating the shutter but also for obtaining the desired intermittent operation of the film feeding sprocket.

Figure 1:
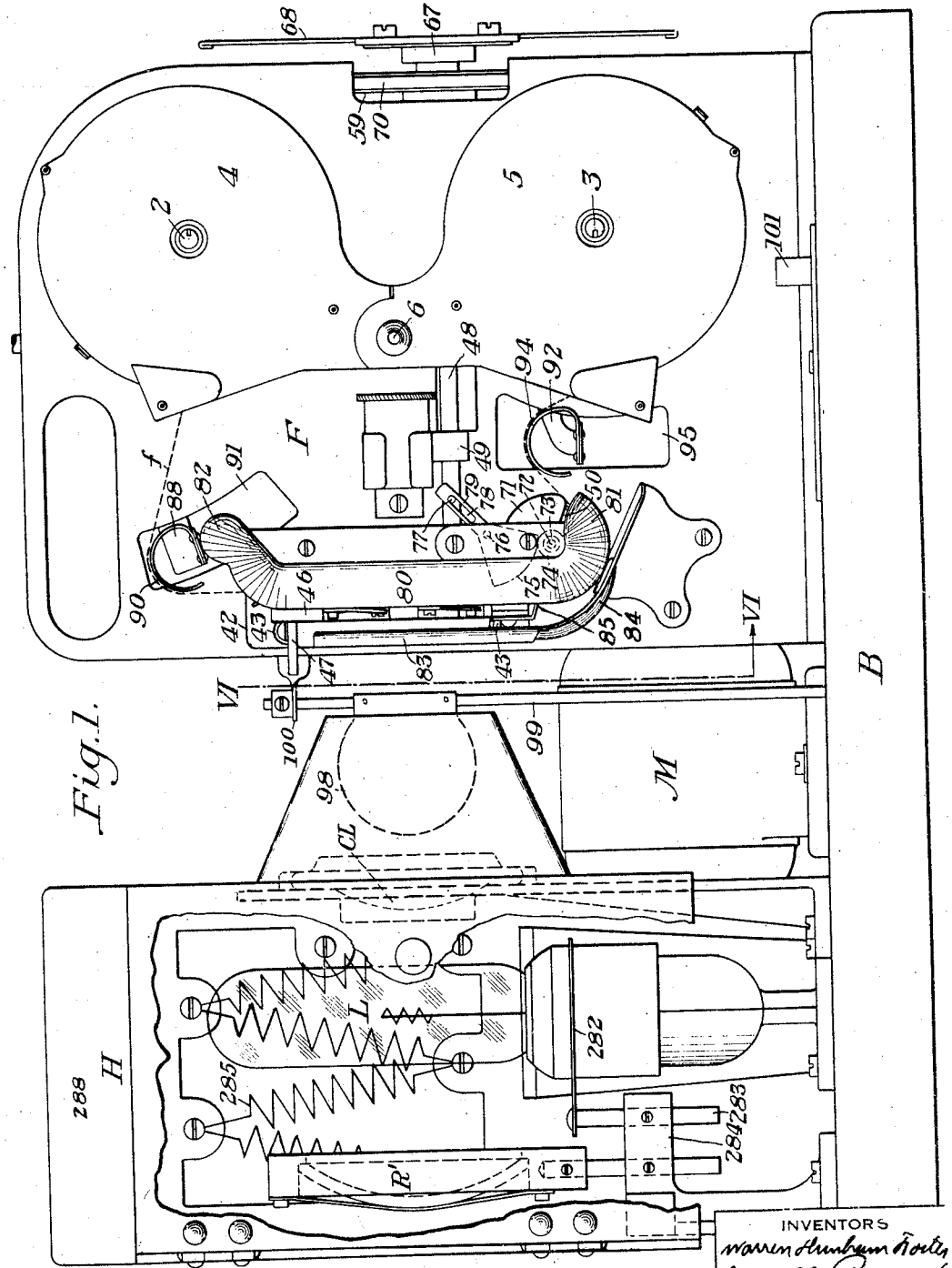
Figure 1 is a right side elevation of the machine, certain parts of the lamp housing being broken away.
Figure 2:
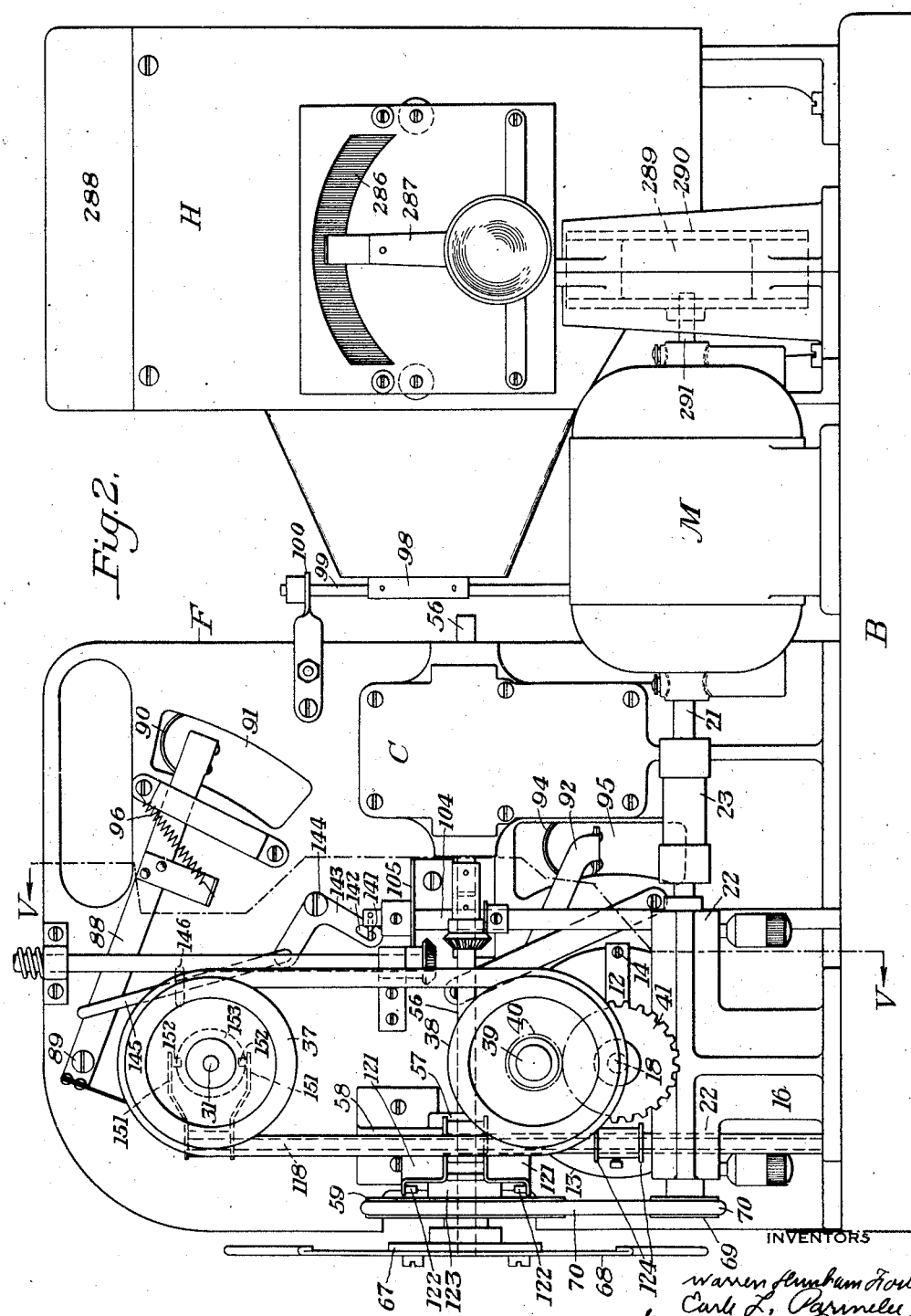
Figure 2 is a left side elevation of the machine.

Cooperating with the sprocket 50 and normally occupying the position illustrated in Figure 1 of the drawings, is a stripping shield 71 carried by the inner end of a pin 72 supported in a suitable manner by a bearing 73 constituting part of the fixed gate section 42. Also secured to the shaft 72 is a pinion 74 with which meshes an arcuate rack 75 having a pivotal mounting 76 and operated simultaneously with the operation of the gate rod 48 by means of a pin 77 projecting outwardly from the gate opening rod and engaging a slot 78 in the extension 79 of the arcuate rack. With the construction just described, movement of the gate opening rod to the left as viewed in Figure 1 for the purpose of opening the relatively separable gate sections, will effect rotation of the rack in a counter-clockwise direction as viewed in this figure, thereby rotating the shield in a clockwise direction. This rotational movement of the shield will be effective for engaging the film f and stripping the same from the sprocket preparatory to the removal of the film from the apparatus. It will remain in this position covering certain of the teeth of the sprocket during the application of a new film or during rewinding, whereby the threading operation of the film is greatly expedited or the film protected during rewinding.

For further assisting the threading movement, the relatively fixed gate section 42 is provided with a projecting guide 80 having a generally curved contour for gradually feeding the film over the fixed gate section, the guide having a downwardly curved and inclined lower end 81 for insuring passage of the film over the sprocket and an upwardly inclined and curved upper end 82 for the purpose hereinafter more fully set forth. The frame F also has secured thereto a secondary guide member 83 positioned in spaced relation to the guiding member 80 and adapted to extend substantially in alignment with the inner face of the movable gate section when it has been moved to open position, whereby the film is effectively guided into position between these gate sections. The member 83 has a curved lower end 84 having a function corresponding to that of the curved end 82 of the guide member 80, and described in detail hereinafter. Projecting downwardly from the lower end of the movable gate section is a pair of spaced guide fingers 85 curved to generally conform to the curvature of the sprocket 50, the space between these fingers being sufficient to accommodate the teeth 51 of the sprocket. These guides cooperate in a manner, as will be readily apparent from the drawings, to permit a film to be positioned between the gate members by merely moving the same laterally relative to its normal direction of travel through the gate. This greatly lessens the time required for threading new film into position, and enables the operation to be performed satisfactorily by an unskilled operator.

In order to entirely obviate the necessity of manually producing slack or loops as heretofore required, there is provided a tension control means of the general character set forth in the application before referred to, and in Bundick and Proctor application Serial No. 44,482, filed July 18, 1925. This tension control preferably comprises braking means automatically operated by the film, and comprising an upper brake 86 cooperating with the brake drum 29 on the rewinding spindle 2 and a lower brake 87 cooperating with the brake drum 8 on the driving spindle 3. The upper brake 86 is carried by a brake lever 88 having a pivotal mounting 89 on the frame F at the rear thereof and having secured to its opposite end a film guide 90 projecting forwardly through a suitable opening 91 in the frame F. The lower brake 87 is in turn preferably carried by a curved lever 92 secured to a plate 93 loosely surrounding the boss 7a of frame F whereby the plate as a unit may be rotated around this boss. At its opposite end the curved lever 92 is provided with a film guide 94 projecting forwardly through a suitable opening 95 in the frame F. During the feeding of a film through the apparatus all of the parts occupy the position illustrated in Figure 1 while during the threading of a film into position or the removal of a film from the apparatus, the parts occupy the position illustrated in Figure 3. In this latter position it will be noted that the guide 94 occupies such a position with respect to the curved lower end 84 of the guide member 83 as to insure the passage of a film upwardly around the guide 94 automatically upon lateral movement of the film, while the guide 90 occupies such a position with respect to the upwardly inclined curved upper end 82 of the guide member 80 as to insure passage of a film over and around the guide 90 by the operation referred to. The lever 88 is normally swung in such direction as to cause the brake 86 to contact with the drum 29 by means of a spring 96. Due to the action of this spring, the brake 86 normally tends to prevent too free rotation of the rewinding shaft and thereby prevents the formation of an undue amount of slack. In the event, however, of not sufficient slack, the tension on the film causes the lever 88 to move in opposition to the action of the spring 96, thereby relieving the braking action of the brake 86 to a corresponding extent and again producing the desired amount of operating slack or loop with a resultant desired tension on the film.

The lower brake 87, on the other hand, is normally so positioned as to exert no appreciable braking action on the drum 8. In the event, however, of undue tension on the film between the feeding sprocket 50 and the reel carried by the driving spindle 3, the film will be effective for swinging the lever 92 in such direction about its pivotal mounting 97 on the plate 93 as to bring the brake 87 into more effective braking engagement with the drum 8. Due to the fact that the spindle 3 is driven from the motor through a friction drive, this braking action will be effective for decreasing the driving force on the spindle 3, and consequently will relieve the tension on the film and produce the desired operating conditions between the sprocket and the lower reel. In this manner the required tension on the film with the requisite amount of slack or loop to insure proper feeding is automatically produced by the mere threading of the film into position and is automatically maintained by the operation of the tension or braking mechanism.

In order to make it unnecessary to utilize any considerable portion of the film for titles or legends, which are obviously adapted for so-called still projection, the apparatus is adapted to periodically occupy a position in which this still projection can be obtained. Preferably, the film, by means of the light transmitted thereby, will be effective for automatically controlling the change in operating conditions of the apparatus to effect projection in motion, or still projection, the interval of time devoted to the actual still projection being entirely automatically produced, preferably by the film and light responsive mechanism controlled thereby.

When the apparatus is utilized for this so-called "still" projection of pictures, titles or legends, it is necessary to provide means in the path of travel of the light rays for protecting the film against danger of injury by reason of undue temperature conditions. For effectively shielding the film during such period, there is provided a trap or shield 98 carried by a shaft 99 having its upper end journaled in a bearing 100 projecting from the frame F and having its lower end suitably journaled in the supporting base B. This shaft is adapted to be periodically and intermittently operated in accordance with the character of operation of the machine for bringing the shield positively into position when the apparatus is operating for the still projection of pictures and to throw it out of position for the projection of pictures in motion.

While the present apparatus is not necessarily limited to any particular field of use, it is primarily intended either for use in advertising for the successive showing of a length of film or for use by persons who may be unskilled in the art. With this dual purpose in view, it is desirable not only to provide for automatic control, but also to simplify the control to as great an extent as possible not only for the purpose of rendering the operation easier, but for the purpose of making such operation foolproof. For this purpose there is preferably provided a single control member in the form of a knob or button 101 projecting upwardly through an arcuate slot 102 in the supporting base B. This slot may be so shaped as to provide four operating stations designated, respectively, S1, S2, S3 and S4. The button 101 is adapted to be moved at will either manually so as to occupy any one of these stations, or automatically so as to occupy any of stations S1, S2 or S4. With this button at the station S1, the respective parts of the apparatus are in such position as to insure the normal projection of pictures as usual motion pictures. With the control button at station S2, there is obtained a so-called still or stereopticon projection, the movement of the button from the station S1 to the station S2 being effective for disengaging the respective driving mechanisms which are in operation during the projection of pictures in motion. With the button in position at station S3, the respective parts of the apparatus are in such position as to permit the positioning of a film therein or the removal of a film which has just been fed therethrough. It will be understood that the movement of the button from station S2 to station S3 automatically produces the required change in the operating position of the parts. With the button in position at station S4, the respective parts of the apparatus are in such position as to permit rewinding of the film by means of the motor M. The movement of the button from station S3 to station S4 automatically produces the required change in operating conditions necessary for such rewinding. This provision of a single control member movable only in a predetermined manner and automatically effective upon movement for producing all of the necessary changes in operating conditions constitutes an important feature of the present invention, as it renders the control and operation of the apparatus extremely simple and substantially foolproof.

The control mechanism actuated either manually by the control knob or automatically as hereinafter set forth in detail, is to a large extent shown in Figures 7, 8, 9 and 10, inclusive, and diagrammatically in Figure 11, which illustrate in succession the change in the position of the parts of the control mechanism by movement of the control button successively to the respective stations, and the circuits by means of which the desired movements are produced. This mechanism may comprise a lever 103 keyed or otherwise secured to the lower end of a brake release rod 104 having its lower end journaled in any desired manner in the base B and its upper end journaled in a bearing bracket 105. Being secured to the brake release rod 104 which is capable only of a turning movement about its longitudinal axis, the lever 103 is restricted in its movements to rotation only. Carried by the rotating lever 103 is a combined sliding and rotating lever 106 having adjacent each end a slot 107 through each of which projects a headed pin 108 by means of which the combined sliding and rotating lever is effectively mounted on the rotating lever for rotational movement simultaneously therewith and sliding movement independently thereof. At its front end the lever 106 carries an upstanding pin 109 having a head 110 provided with an inwardly projecting pin 110' adapted to engage a bayonet shaped slot 111 in the pin 109. By reason of this construction it will be apparent that the button may be moved vertically on the pin 109 by a rotative movement thereof so that it may either occupy an upper or a lower position on the pin. At its lower end the button has a collar 113 of a diameter to substantially conform to the contour of the slot 102 at the respective operating stations, whereby with the button in its lower position accidental movement from one of these stations is prevented, while with the button in its upper position the parts are free for automatic operation independently of any operator.

At a point intermediate its length the combined rotating and sliding lever 106 is provided with a transversely extending recess 114 adapted to cooperate with a pin 115 projecting from a lever 116 which is secured adjacent one end on a control sleeve 117 surrounding a control rod 118, the sleeve and rod extending upwardly through the base B and journaled for rotational movement in bearings carried by the bracket 16 and by an upper bearing 120 carried by the bracket 33. Adjacent its upper end the control sleeve 117 has projecting therefrom forked operating arms 121 carrying projecting pins 122 adapted to normally lie in the groove 123 of the clutch member 62 on the shutter shaft 56. By reason of this construction it will be apparent that upon rotation of the sleeve 117 in a counter-clockwise direction, as viewed in Figure 7, the clutch members 60 and 61 will be disengaged, thereby destroying the driving relationship between the main drive shaft 21 and the shutter shaft 56.

At an intermediate point the control sleeve is also provided with a similar pair of arms 124 having pins 125 normally projecting into the groove 126 of the clutch collar 25. Rotation of the sleeve in a counter-clockwise direction as just described will be effective through the arms 124 for disengaging the driving spindle clutch to thereby permit the driving spindle to move freely in either direction. Engagement of the driving spindle clutch and the shutter shaft clutch will be effective for the so-called projection of pictures in motion but this engagement is not required for still or stereopticon results. This operation of the sleeve 117 is obtained by moving the control button from station S1 to station S2, or from the position shown in Figure 7 to the position shown in Figure 8, by reason of the relative movement imparted to the sleeve due to the sliding action of the lever 106.

Pivotally mounted adjacent the side of the combined sliding and swinging lever structure is a friction and positive detent 127. One end of this detent has connected thereto one end of a tension spring 128, the opposite end of which is secured to a suitable projection on the base B of the apparatus. The spring normally tends to swing the detent in a counterclockwise direction about its pivotal mounting as will be apparent from the drawings. This forces the upper end of the detent into frictional engagement with the sides of the levers 103 and 106, thereby tending to frictionally hold the same in any position to which they may be moved.

In changing from the normal projection to the projection of still pictures, it is also necessary to move the shield or screen 98 into position. This is positively accomplished simultaneously or in timed relation with the rotation of the sleeve 117, through the medium of a lever 129, pivoted at its intermediate portion on a stud pivot 130, secured in the base B. At one end the lever 129 has a slot 131, within which projects the pin 115 on the lever 116. At its opposite end, the lever 129 is pivotally connected to a link 133, the opposite end of which is connected to a crank arm 134, secured to the lower end of the shaft 99. The opposite end of the lever 129 is curved to provide a recess, as clearly shown in the drawings, adapted to permit the desired operation of the detent 127 without interference therewith. Through the medium of the mechanism just described, the movement of the lever 106 from station S1 to station S2 will rotate the lever 129 in such direction as to swing the heat shield into light-intercepting position. It will be noted that this movement of the light shield takes place positively in timed relation to the movement of the operating parts necessary in obtaining still projection, and thereby eliminates any possibility of injury to a film while stationary.

It may be assumed that after the single projection of a film, or the repeated projection thereof, it is desired to change the same, or that in starting it may be necessary to move the parts of the apparatus into such position that a film may be threaded into position therein. Under such circumstances, the control button will be moved from station S2 to station S3. This movement will be effective only for rotating the brake release rod 104 and for bringing a recess 137 in the lever 106 into cooperative engagement with a pin 138, projecting upwardly from a lever 139, secured to the lower end of the control rod 118.

The lever 139 is normally held in the position shown in Figures 7, 8 and 9 by a tension spring 140, which may be secured in any desired manner to the base B of the apparatus. In this position, the pin 138 will be received by the slot 137 when the parts are rotated in the manner described.

At the commencement of the movement from station S2 to station S3, the combined swinging and sliding lever structure will be moved away from the detent 127, thereby permitting it to swing in a counterclockwise direction under the influence of its tension spring. This movement will be effective for bringing the notched end of the detent into engagement with the projection 116' of the end of the lever 116, whereby the lever 116 and its associated parts will be held in the proper position.

Figure 4:
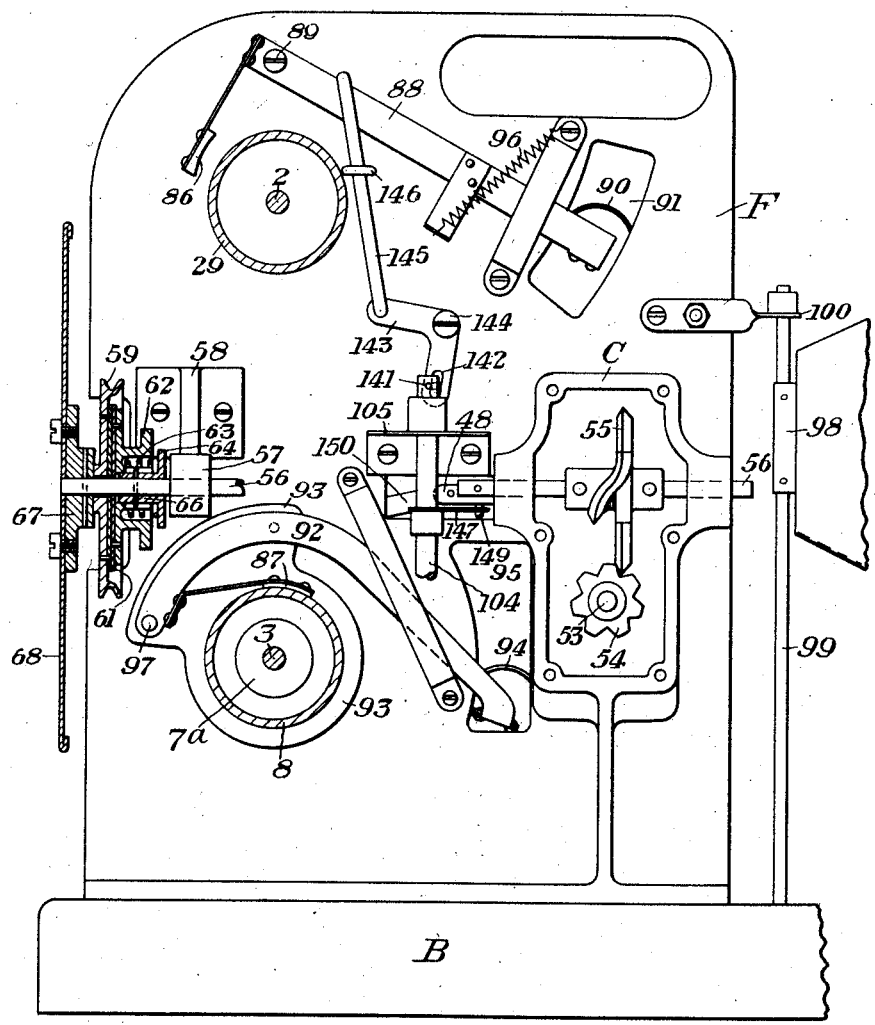
Figure 4 is a partial left side elevation broken away to show actuating parts in film threading position.

The rotation of the brake release rod is effective for opening the gate sections of the gate, for moving the brakes 86 and 87 and their associated parts to inoperative position and for so actuating the stripper shield 71 as to effect the desired stripping movement of a film from the sprocket 50 or the shielding of the sprocket to permit the threading of a new film into position. These operations are obtained by securing to the upper end of the brake release rod a pin 141 extending into a slot 142 in one arm of a bell-crank lever 143, having a pivotal mounting 144 on the back of the frame F. The opposite arm of the bell crank lever is in cooperative engagement with one end of a link 145 movable through a slide or guide 146 and having its upper end bent inwardly to extend over the brake lever 88. Movement of the control button from the station S2 to the station S3 will be effective for rotating the brake release rod 104 in a clockwise direction, as viewed in Figure 9, thereby rotating the bell crank lever 143 in a counterclockwise direction, as viewed in Figure 4, and consequently, rotating the brake lever 88 about its pivotal mounting 89 in opposition to the spring 96 for moving the brake 86 to inoperative position.

Figure 3:
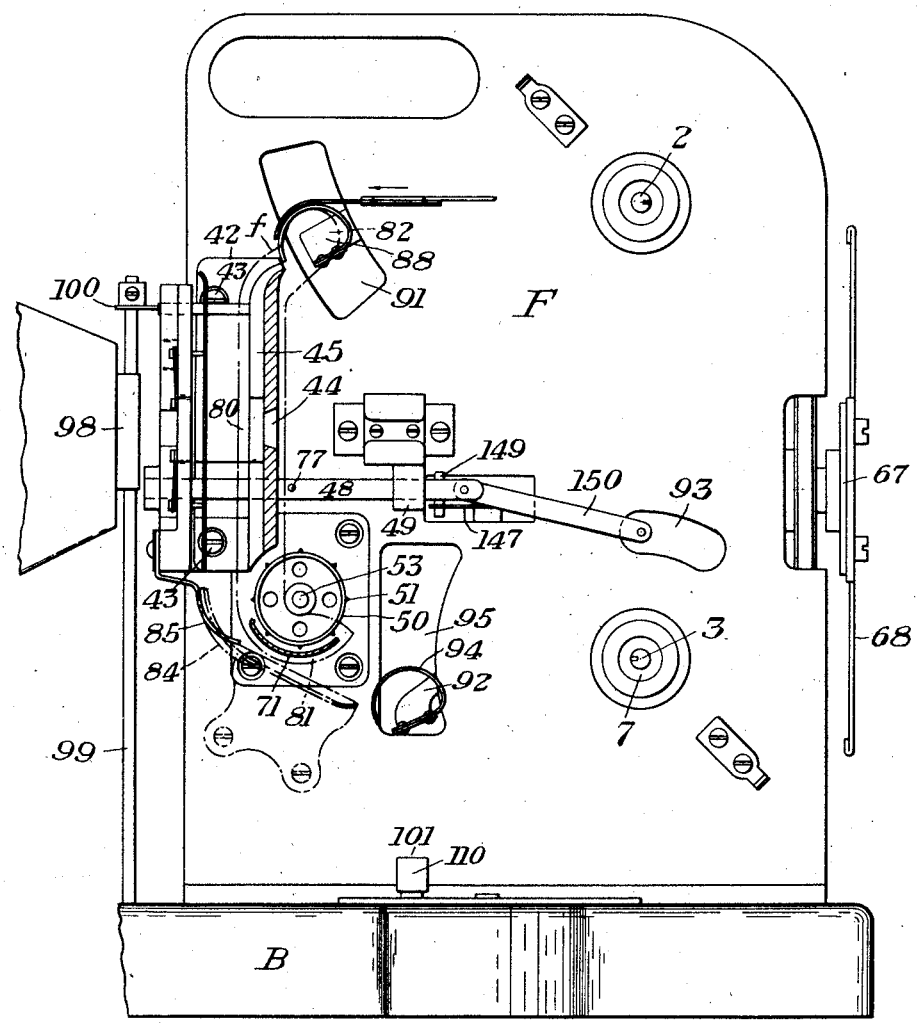
Figure 3 is a partial right side elevation broken away to show actuating parts in film threading position.

Movement of the lower brake is obtained simultaneously with actuation of the upper brake through the medium of a crank lever 147, secured at an intermediate point to the brake release rod. This crank lever has a slot 148 in its free end into which projects a downwardly extending pin 149 carried by the gate control rod 48. The right hand end of the gate control rod as viewed in Figure 3, is connected by a link 150 with the brake lever 92, whereby said brake lever and the gate control rod operate in unison. Movement of the brake release rod occasioned by operation of the control button from station S2 to station S3 is effective for rotating the parts 93 and all parts carried thereby in such direction as to lower the film guide 94 in the slot 95 and bring it into such cooperative relation to the guides 80 and 83 as shown in Figure 3, as to facilitate the removal of a film or the positioning of another film. This movement of the gate control rod will also tend to separate the gate sections and will move the shield 71 into stripping and shielding position, as will be obvious.

If it is not desired to change a film, as would be the case in advertising for example, the control button may be moved from station S3 to station S4, or may be moved from station S2 to station S4 without stopping at station S3. This movement will be effective by reason of the engagement between the recess 137 and the pin 138 for rotating the control rod 118. At its upper end, this control rod carries spaced arms 151, similar to the arms 121 and 124, previously described and provided with pins 152, normally lying in the groove 153, in the rewinding clutch collar 36. The rotation of the control rod 118, as occasioned by the movement of the control button from station S3 to station S4, will be such as to move the rewinding clutch into operative position, whereby the spindle 2 is connected in driving engagement with the shaft 31, this engagement being such that the film may be rewound by the continued operation of the motor M.

During this time, the spring 140 will be held under tension in such manner that should an operator fail to completely position the button at the station S4, the spring will be effective for automatically restoring the parts to an inoperative position at station S3.

From the foregoing, it will be apparent that the operation of a single control button performs in succession the necessary changes in the operating positions of the various parts for permitting any desired condition of operation of the apparatus. Upon movement of the control button from station S4 to station S3, the rewinding clutch will be disengaged and the lever 139 held in position by the spring 140. Upon movement from the station S3 to the station S2, the recess 137 will leave the pin 138 and the brake release rod 104 will be rotated in the opposite direction to that heretofore described.

During this movement, the combined swinging and lever structure will come into engagement with the detent 127 and swing it in a clockwise direction against the action of its controlling spring, to thereby release the projection 116' from the holding action of the detent, and permit the lever 116 and its associated parts to be subsequently moved as required, upon movement of the control button from station S2 to station S1. Such movement of the button will swing the lever 116 in the opposite direction to that previously described, and thereby effect re-engagement of the shutter clutch and of the driving spindle clutch. At the same time lever 129 will be restored to its original position, thereby, in turn, effecting movement of the heat shield to inoperative position.

Reference has heretofore been made to the adaptability of the apparatus to advertising or other purposes wherein repetition showing of the film is desirable, and wherein for practical reasons, it is not feasible to have an operator in constant attendance. In such cases, the movement of the control parts may be automatically obtained merely by moving the control button 101 to its upper position on the pin 109 as before described. When in this position, there will be no holding or locking effected by the button so that all of the parts are free for automatic operation. Mechanism for this purpose is shown in Figures 7, 8, 9, 10 and 11.

As shown in Figures 7 to 10, both inclusive, one form of mechanism may comprise a disk 160 having a pivotal or rotative support 161 on the base B. This disk has secured thereto the pin 109, whereby rotation of the disk will accomplish the same movement of the control mechanism as is effected by movement of the button 101. Such rotation may be obtained by providing a pinion 162, concentric with the support 161. Cooperating with this pinion is a rack 163, preferably of rectangular or angular cross section, whereby it may be effectively held in the desired operating position by means of guides 164 on the base B. Formed in the disk 160 is an arcuate slot 165 into which extends a stop pin 166, projecting downwardly from the base of the apparatus. The length of the slot is such that it will just permit enough rotation of the disk to move the pin 109 from station S1 to station S4 or vice versa, the stop pin positively stopping the disk in desired position at these stations. Accidental movement away from these stations may be prevented by the provision of a comparatively strong tension spring 167, having one end secured to the disk and the opposite end attached to the base B, the point of attachment to the disk being such that after the disk passes a midpoint between stations S1 and S4, the spring will be effective for assisting in completing such movement, the spring being placed under gradually increasing tension until such midpoint is reached.

It will be obvious to those skilled in this art that at this time, the spring 167 will effectively overcome the action of the spring 140, whereby after the button has been moved a distance far enough to effect the desired operation of the apparatus, the spring 167 will prevent return of the parts to neutral position at station S3.

For producing movement of the rack bar 163, it may be constructed either throughout, or may have end portions, of magnetic material adapted to act as cores for the solenoids 168 and 169. As viewed in Figures 7 to 10, it will be obvious that energization of the solenoid 168 will be effective for rotating the disk 160 in a clockwise direction, while energization of the solenoid 169 will effect rotation of the disk in the opposite direction. Thus, the solenoid 168 will be effective for moving the control mechanism from station S1 to station S4 to establish rewinding conditions, while the solenoid 169 will be operative at the conclusion of rewinding to re-establish projecting conditions.

The energization of the respective solenoids at predetermined time intervals may obviously be accomplished automatically in a number of different ways.

As illustrated more particularly in Figure 11 of the drawings, this operation may be effected and controlled directly by the light transmitted by the film $f$. In this figure, the light source L is diagrammatically indicated, as is also any usual form of condensing lens CL. The light from the source passes generally as indicated by the broken lines, through the condenser lens, and thus to and through the film $f$, where the film is of the transparent type. On the opposite side of the film is arranged any desired form of objective lens, operating as well understood in the art. Positioned in any desired manner, so as to be operated upon by light transmitted through the film, where it is of the transparent type, either before the light has gone through the objective lens or after it has passed through such lens, is a mirror or other reflecting surface $m$. During normal operation of the apparatus, the film will be of such nature, in accordance with this embodiment of the invention, that no direct light rays will reach the mirror $m$. At any predetermined point, however, the film may be of such special construction as to permit the passage of light directly to this mirror. At such time, the mirror will serve to reflect such light, as indicated in broken lines, onto a light sensitive or photo-electric material 170 of any desired nature, such as a selenium cell, metallic potassium cell, or the like. Such light will have the effect of decreasing the resistance of the cell to the travel of an electric current, and this change in resistance may be utilized for controlling the operation of the solenoid 168. The light-sensitive material may be in series with an electric circuit by connecting one portion thereof by means of a wire 171 to one side of a suitable source of current 172 and by connecting the other side through a wire 173 directly to one terminal of a relay 174. The opposite terminal of the relay 174 has a connection 175 to the opposite side of the source of current 172. When the element 170 is under the influence of light, the relay 174 will be effective for moving its armature 176 in opposition to the holding action of the spring 177, and thereby bring it into engagement with the contact 178. The contact 178 is connected by means of a suitable conductor 179 to one terminal of the solenoid 168, while the armature 176 of the relay is electrically connected to the opposite side of the solenoid through a source of current 180. It will thus be apparent that when the element 170 is under the influence of light, the solenoid 168 will be energized. This operation is desirable when a film has completed its travel in a normal feeding direction and is ready for rewinding. By properly marking the film, the element 170 is automatically subjected to light at the desired point in the film travel, the solenoid 168 energized and the disk 160 rotated in such direction that the parts are moved from station S1 to station S4, and the rewinding of the film accordingly accomplished. In several of the attached claims as a matter of brevity and convenience, the expression "photo-electric cell" has been used. This phrase is to be taken to include any type of light sensitive element, whether it modifies an electric current which is delivered to it or creates an electric current directly, or whether it is actuated by relative brightness or relative darkness.

At the conclusion of the movement of the film in a rewinding direction, it is desirable to automatically stop such movement and initiate a normal feeding movement for projection purposes in the opposite direction. This may be accomplished by providing a second mirror $m'$, adapted to cooperate with a second light-sensitive element 181. Normally, the film will be so marked that the mirror $m'$ receives no direct rays of light. At the conclusion of the movement of the film in a rewinding direction, however, a predetermined marking on the film will permit the transmission of light directly to the mirror $m'$, which will, in turn, be operative for focusing it onto the element 181. This element is in series with an electric circuit, comprising a connection 182, to one side of the source of current 172, and a second connection 183 with one terminal of a relay 184. The opposite terminal of this relay has a connection 185 to the source of current 172. When the element 181 is under the influence of light, the relay 184 will be effective for moving its armature 186 in opposition to the holding spring 187 and bring it into engagement with a contact 188. This contact has a connection 189 to one side of the solenoid 169, the armature 186 of the relay being connected to the opposite side of the solenoid 169 through the source of current 180. Thus, when the film concludes its movement in a rewinding direction, the light transmitted by the film, where the film is of a transparent nature, will be effective on the element 181 for closing the circuit to the solenoid 169.

It will be apparent that during the normal travel of the film for projecting purposes the film will be in the desired position with respect to the light source and various apertures and lenses, whereby well defined rays from a definite portion or portions of the film may be effectively directed at will onto the element 170. During the rewinding process, however, the gate is open, thereby permitting the film to move out of focus with respect to the various parts referred to, although it does move within certain limits in a prescribed path of travel. At the conclusion of the rewinding operation, the tension exerted on the film by the rewinding spindle 2 tends to pull the film into substantially the same position which it occupies during normal periods of travel for projection purposes. When pulled into this position, a definite portion or portions of the film will then be effective for obtaining the desired concentration of light onto the mirror $m'$ and consequently the element 181. Inasmuch as the rewinding spindle 2 is frictionally driven, the film is automatically pulled into the desired position and retained therein, without injury to the film, until the light concentrated onto the element 181 becomes effective for producing a normal film operation in a projecting direction.

It is quite common practice at the present time to utilize a leader which is transparent. Upon the conclusion of the rewinding operation this transparent leader occupies a position in focus with respect to the light whereby it is a simple matter to obtain the requisite light for the operation of the solenoid 169 even though the heat shutter 98 is in light intercepting position. In order to prevent this transparent leader from being effective equally on both of the mirrors, a predetermined zone or zones thereof may be darkened to prevent the concentration of direct rays at this time onto the mirror $m$.

In usual forms of apparatus in which the film is not displaced from its usual path of travel during rewinding the problem of light control is extremely simple in both directions of travel of the film whether the rewinding be obtained through a friction drive or not. With the form of apparatus illustrated herein, however, this friction drive is extremely important in connection with the control by light at the conclusion of the rewinding operation. It will be apparent that the desired reversals in the direction of travel of the film are obtained without throwing any extra load onto the motor M. Its maximum duty, and therefore its size, may thus be determined entirely by the projecting and rewinding operations, together with cooling as hereinafter described. This enables the use of a motor of minimum size and power consumption which may be continuously operated in one direction during the use of the apparatus.

It will be obvious to those skilled in the art that unless some supplemental control for the motor is provided, it will be necessary to strip the film from the sprocket prior to actual reversal and at such time as the sprocket may be rotating at a speed high enough to render the film liable to injury. This may be effectively obviated by a construction such as illustrated in Figure 22 or 23.

As illustrated in Figure 22, the motor M may have a brake drum 190 with which cooperates a magnetic brake 191 under the control of magnets or solenoids 192 and 193 connected respectively in parallel with the solenoids 168 and 169, as clearly shown in the drawings, whereby energization of either of the solenoids 168 or 169 will be effective for simultaneously applying the magnetic brake for reducing the motor speed and consequently the speed of the sprocket or other feeding means. After the film has moved a predetermined distance in a rewinding direction, the circuit to solenoids 168 and 192 will be broken, thereby permitting the motor to operate at full speed for rewinding purposes.

Since it is also desirable to slow down the rotation of the sprocket 50 during its reengagement with the film, there is provided the magnetic means 193 which is operable for applying the brake as long as solenoid 169 is energized. As this solenoid may be retained in circuit until after normal projecting again commences, but is deenergized by such travel of the film, it will be apparent that the desired speed conditions are obtained at the exact time required.

Instead of utilizing a magnetic brake to accomplish the desired decrease in the motor and sprocket speed, this may be obtained by the arrangement illustrated for example in Figure 23 of the drawings in which the initial movement of the rack bar 163 in either direction cuts resistance 194 or 195 into the motor circuit by means of trips 196 and 197 which engage respectively resistance control fingers 198 and 199. As soon as the trips release the fingers, the springs 200 return the fingers to normal position. The trips 196 and 197 may obviously be adjustable on the rack bar for timing the exact period of cutting in resistance.

In addition to effecting slowing down of the sprocket speed, it may also be desired to produce an actual dwell between the disengagement of the driving spindle clutch and the shutter clutch, and the engagement of the rewinding spindle clutch, or vice versa. This may be accomplished by the provision of a suitable timing device herein shown for purposes of illustration only as comprising a dash pot 201 with which cooperate pistons 202 and 203 carried by a projection 204 on the rack 163. The dash pot, which may be of double construction, has a controllable one way acting release 205 for each end thereof whereby the speed of travel of the piston in either direction may be controlled, the length of slot 206 through which the projection 204 extends determining the time at which the dash pot first becomes effective in either direction. This is desirable, as initially the rack bar should move at a high speed to effect disengagement either of the driving spindle clutch and shutter clutch, or disengagement of the rewinding spindle clutch, depending on the direction of travel of the rack bar. Thereafter, the dash pot becomes effective, and by the setting of the release valves 205, variably times the period of dwell before the concluding movement of the rack bar is accomplished. This variable timing is of importance, as it provides flexibility for different operating conditions, or films of different characteristics. It will be apparent to those skilled in the art that the dash pot may be of special construction having a variable speed of movement at different times, whereby it may have a gradually accelerating speed in either direction after a period of relatively slow movement.

As before set forth, titles, legends and the like are of such nature that still projection thereof accomplishes all of the results desired. Where such still projection can be obtained, it is possible to effect a saving of a very substantial portion of each length of film, as the desired matter need only appear in a comparatively few frames, the film remaining stationary while at least one of these frames is in projecting position. In order, however, to make it possible to obtain the full advantages of such an operation, it must be possible to change automatically from normal projection of pictures in motion to so-called still projection. The present invention embodies means by which this change in operating conditions may be automatically produced entirely by variations of light quality or intensity, and the film held stationary for a predetermined unit time interval or for a time interval representing any desired multiple of the unit interval. In Figure 11 there is illustrated diagrammatically one form of circuit by means of which this operation may be effectively obtained. In accordance with this embodiment, there may be provided a mirror $m^2$ adapted to cooperate with the film in such manner that it normally does not receive any direct rays of light from the film $f$, but cooperating therewith in such manner that by properly marking the film in a predetermined zone or zones it may be subjected to direct rays. Any rays so directed onto the mirror $m^2$ will be in turn concentrated upon a light sensitive element 207 constituting part of an electrical circuit which includes a relay 208. This circuit may be obtained by providing a connection 209 from one side of the light sensitive element 207 to the wire 182 and thence by means of this wire to the source of current 172, the opposite side of which has a connection 210 to one terminal of the relay 208, and by providing a second connection 211 between the opposite terminal of the element 207 and the opposite terminal of the relay 208. By reason of this arrangement, light concentrated upon the element 207 will decrease its resistance to an extent to permit current from the source 172 to effectively energize the relay 208 and move its armature 212 in opposition to the holding means 213. This movement of the armature is utilized for controlling the energization of a solenoid 214. This solenoid cooperates with a core 215 which may, as a matter of operating convenience, be carried by the projection 204. The solenoid 214 when energized will be effective for moving the disk 160 in a clock wise direction. The dimensioning of the core 215 with respect to the center of the magnetic field of the solenoid 214 is such that the solenoid will only be effective for moving the disk 160 a distance sufficient to bring the pin 109 to station S2 which is the station for still projection. Inasmuch as it is desirable to retain the parts in position at station S2 for a predetermined unit time interval, or for a period representing a multiple of such unit intervals, it is necessary to provide means for controlling the period of deenergization of the solenoid 214 to permit the spring 167 to automatically restore the parts to normal projecting position at station S1. This control may be obtained by providing a swinging contact 216 having a connection 217 to one side of a source of current 218, the opposite side of which has a connection 219 to one terminal of a time relay 220, the opposite terminal of which is connected by wire 221 to the armature 212. Thus the movement of the armature 212 under the influence of the relay 208 automatically energizes the time relay. The swinging contact 216 is of such construction and is so positioned that the circuit to the time relay is completed during the initial movement of the armature 212 under the influence of the relay. Thereafter the armature swings under and beyond the swinging contact 216, whereby the insulated portion 222 of the swinging contact is in position to be engaged by the armature upon its rearward movement.

When the time relay 220 is energized it will be effective for drawing the armature 223 to the right, as shown in the drawings, against the action of the spring 224, whereby it will be brought into engagement with the contact 225. This contact has a connection 226 to one side of the solenoid 214, the opposite side of which has a connection 227 to one side of a source of current 228, which in turn has a connection 229 to the armature. It will thus be apparent that when the time relay is energized it will be effective for closing the circuit, including the solenoid 214, which in turn will operate to move the core 215 to the left, as viewed in the drawings, and thereby produce clockwise rotation of the disk 160 to an amount sufficient to move the parts from an operating position at station S1 to station S2. The parts will obviously remain in this position so long as the circuit, including the solenoid coil 214, is energized. This time interval may be accurately controlled by the selection of the time relay. It may be assumed, for example, that it is desired to maintain the film in position for still or stereopticon projection for a period of fifteen seconds. In such event the time relay will be of such nature as to automatically open its circuit at the end of this period of time. This in turn will break the circuit to the solenoid 214, permitting the spring 167 to return the disk 160 to its original position in which the parts are ready for normal projection purposes.

It will be apparent that by reason of the dash pot 201 the return movement of the disk 160 will be relatively restricted. It is therefore necessary to prevent a second operation of the armature 212 until such time as the solenoid has become completely de-energized and the parts have returned to such a position that normal projecting movement of the film is obtained. In order to obtain this result there may be connected to the armature 212 a suitable means for limiting its speed of return movement under the influence of the spring 213. Such means may conveniently be in the form of a dashpot 230, having a piston 231 operatively connected to the armature. The piston may have a one-way valve 232 therein, and the cylinder may be provided with a regulable valve 233. With a construction of this character, the one-way valve 232 in the piston will permit the piston to travel to the left, as viewed in the drawings, at a rate of speed substantially equal to that which would be obtained if the dashpot were not provided. Upon de-energization of the relay 208, however, the return movement of the armature 212 will be delayed, the delay being so regulated by the valve 233 as to prevent a second operation of the armature 212 under the influence of the element 207 and the relay 208 until the film has actually moved out of the original position which occasioned the first operation.

If it should happen that the title is one of undue length, requiring projection for a period longer than that determined upon for the original unit, the film may be so marked that upon movement of the next picture into projecting position light will again be directed onto the mirror $m^2$ for obtaining a second operation of the relay 208 and in turn the solenoid 214. This operation may be repeated any number of times, thereby enabling a given title or other descriptive matter to be displayed for any desired period of time representing any multiple of the original unit timed interval.

It will be understood that with the parts in position at station S2, the heat shield is in position and the shutter is out of operation. While it will be obvious that the shutter may be continued in operation if such action is desired, it has been found extremely desirable in many cases to effect cessation of shutter operation and movement of the heat shield into operative position substantially simultaneously. The heat shield enables the use of a light source such as to give the desired results for normal projection which is usually considered as requiring approximately 40 per cent more light than that necessary for still projection. The heat shield may then be designed to filter out or obstruct approximately 40 per cent of the light rays, thereby preventing the film from becoming injured by the heat of the light rays focused thereon. The heat shield herein shown is constructed of copper screening of a suitable mesh, although it will be understood that other forms of heat shield may be effectively utilized. In other forms of apparatus in which a heat shield has not been provided, it has been necessary in order not to injure the film during periods of still projection, to use a light source insufficient for normal projection in motion. In still other cases where a heat shield has not been provided, it has been proposed to effect actual substitution of the condensing lens system, a condensing lens of relatively high efficiency being utilized for projection of pictures in motion, while a condensing lens system of relatively low efficiency is utilized for the projection of so-called still or stereopticon pictures. The stopping of the shutter during still projection is also desirable, as it not only insures clear projection during periods of still projection, but also renders all of the light passing through the shield capable of being effectively utilized. In other forms of apparatus the shutter has been continuously operated during still projection. Thus it will be seen that for the light necessarily absorbed by the heat shield when the still projection is effected, there is approximate compensation because of the cessation of movement of the shutter.

In Figure 24 of the drawings there is illustrated a slightly modified form of the present invention by means of which it is possible to eliminate entirely the heat shield while still obtaining all of the advantages previously referred to. It will be apparent that since the object of a heat shield is to cut down the effective light concentrated on the film, it is possible to obtain all of the results and benefits obtained by a heat shield by merely varying the amount of resistance in the lamp circuit. For example, the amount of resistance may be increased during periods of still projection while the amount of resistance may be decreased during periods of normal projection. As illustrated in Figure 24 of the drawings, this may be obtained by entirely omitting the heat shield shaft 99 and its associated parts, including the heat shield, and utilizing the free end of the lever 129 as a rheostat arm directly cooperating with a resistance 234. This resistance is connected at one end with a source of current 235, the opposite side of which is connected to one terminal of the projecting lamp L. The opposite terminal of the projecting lamp may have a connection 236 with the lever 129. With the parts in normal projecting position the lever 129 will occupy the position illustrated in Figure 24 of the drawings in full lines, in which all of the resistance 235 is out of the lamp circuit, thereby providing a maximum available voltage for lighting purposes. With the parts in operative position at all of the other stations, however, the lever 129 will occupy the dotted line position shown in Figure 24 of the drawings, in which a considerable amount of the resistance 234 is effectively cut into the projecting lamp circuit. A decreased lamp intensity will therefore be available for periods of projection of still or stereopticon pictures, during the operations of threading or changing a film, and during the rewinding operation. In other words, there is a decided safety factor involved in this construction in that an operator always starts with a relatively dim light, it being impossible to change a film, or project still pictures under any other conditions. It will be understood that this figure of the drawings is largely diagrammatic, it being possible to position the resistance 234 at any desired point, as, for example, in the lamp housing H wherein it will be under the influence of a blast of cooling air as will hereinafter be more fully apparent.

Where the shutter is stopped during periods of still projection it is necessary to insure means for stopping it in such position that it will not be in the path of projection of the picture being projected. This may be insured, as shown, for example, in Figure 25 of the drawings, by providing on the shutter shaft 56 a cam 237 with which cooperates a spring-pressed roller 238. If the disengagement of the shutter shaft should occur at a time when the roller is on one of the high points of the cam 237, it will be effective for rotating the shutter shaft, as will be obvious. The high points of the cam occupy a definite relation to the shutter blades, so that the rotation, if any, effected by the roller 238 will properly position the shutter.

In other cases, as illustrated, for example, in

Figure 26 of the drawings, the same results may be obtained magnetically. This magnetic operation may be produced by providing on each shutter blade a button 239 of magnetic material, or permanently magnetized material. Carried by the frame F in such position as to cooperate with two blades of the shutter simultaneously, are magnets 240 adapted to attract the buttons 239 and thus properly position the shutter. If desired, the magnets instead of being permanent, may be connected in parallel with the solenoid 214, whereby during all periods when the solenoid 214 is effective for producing still projection, the magnets 240 will be energized.

Figure 12:
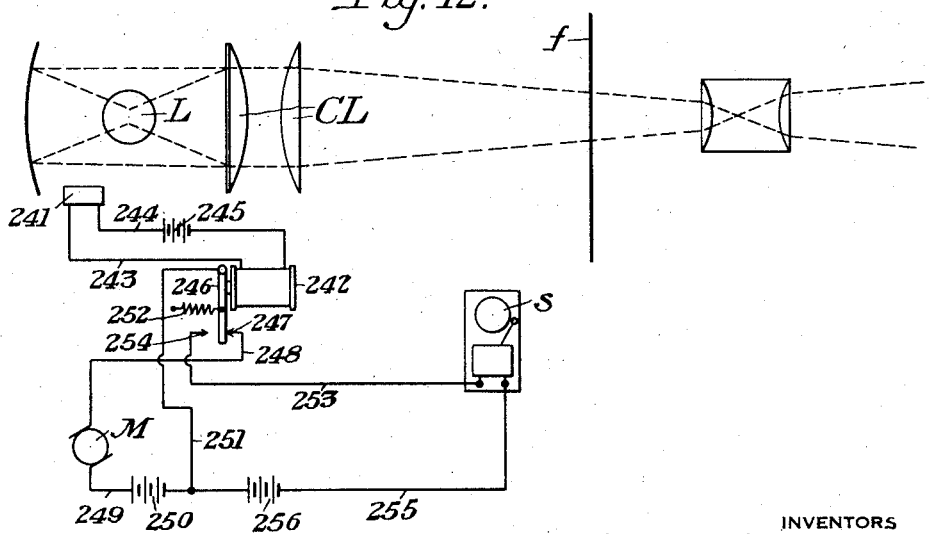
Figure 12 is a diagrammatic view illustrating the manner of stopping the operation of the apparatus in the event of failure of the light source.

Reference has heretofore been made to the desirability, at least in certain cases, of effecting stopping of the motor M in the event of failure of the light source L. This may be conveniently accomplished by an arrangement as illustrated more or less diagrammatically in Figure 12, which comprises a light sensitive element 241 so positioned as to be normally subjected to light from the projecting lamp L. This element may be connected in series with a relay 242 by connecting one side of the relay and one side of the element 241 by a suitable wire 243, and by connecting the opposite side of the photo-electric or light sensitive element by means of a wire 244 and source of current 245 to the opposite side of the relay. By reason of this arrangement the relay will normally be energized, thereby holding its armature in engagement with a contact 247. This contact has a connection 248 to one side of the motor M. The opposite side of the motor has a connection 249 to one side of a source of current 250, while the opposite side of the source of current has a connection 251 to the armature 246. Due to this arrangement, with the armature 246 in a position in which it is maintained normally by the relay 242 and energized, the motor circuit will be closed. In the event of failure of the light, however, the light sensitive element 241 will automatically increase the resistance to the flow of current therethrough, thereby permitting the spring 252 to draw the armature 246 out of circuit-closing position for the motor. In this manner the motor circuit will be automatically broken upon failure of the light source. If desired, this movement of the armature upon failure of the light source may also be utilized for giving a visual or audible signal. This may be accomplished by providing a suitable signal s having one terminal thereof connected by a wire 253 to a fixed contact 254 adapted to be engaged by the armature 246 when it is moved under the influence of the spring 252. The opposite side of the signal may have a connection 255 to one side of a source of current 256, the opposite side of which is connected to the wire 251 to the armature. In this manner, breaking of the motor circuit will be accompanied by a signal which will indicate to an operator the necessity of some attention to the apparatus.

In Figure 13 there is illustrated, more or less diagrammatically, one form of circuit operable in the event of film breakage for automatically opening the motor circuit and also giving a suitable signal. In this figure there is illustrated a mirror $m^3$ which, during normal film operation, is not adapted to receive any direct light rays. In the event of film breakage, however, it will directly receive light rays and focus the same onto a light sensitive element 260. This element is connected in series through a source of current 261 with a relay 262, whereby in the event of concentration of light onto the element 260 the relay will be energized for drawing its armature 262' to the right, as viewed in the drawings, against the action of the spring 263. This movement will be effective for opening the motor circuit, as will be obvious, and at the same time will be effective for closing the circuit which includes the signal device s'. If desired, the mirror $m^3$ may be positioned in such manner that normally it receives a relatively small amount of light during operations with the film intact. In the event of film breakage, however, there will be a marked increase in the amount of light concentrated onto the mirror, which will in turn be effective for decreasing the resistance of the light sensitive element 260 for obtaining relay operation as before set forth.

In Figure 14 of the drawings there is diagrammatically indicated a form of control device effective for signaling or actually producing the initiation or cessation of an associated operation. Such results may be obtained by providing a mirror $m^4$ which is normally not adapted to receive any direct light rays, but which may have light rays directly focused thereon by properly marking the film f. Such light rays will in turn be focused onto a light sensitive element 264 controlling the energization of a relay 265. When the resistance to current flow of the light sensitive element 264 is sufficiently decreased, the relay will be effective for moving its armature 266 to the right, for closing the power or signaling circuit PC for effecting the desired operation. For purposes of illustration, this power circuit may include a phonograph, house lights, signals, radio, advertising or display means, or other desired apparatus as may be found advantageous. The reverse may also be true, and a power circuit P'C' opened under such conditions.

In Figure 21 of the drawings there is illustrated diagrammatically a form of circuit similar to that illustrated in Figure 11, but differing therefrom in that the mirrors $1m$, $1m'$ and $1m^2$ normally all receive light rays, whereby the circuits to the relays 174', 184' and 208' are all normally closed. In this figure, parts corresponding to parts previously described in connection more particularly with Figure 11, are designated by the same reference numbers having a prime affixed thereto in each instance, and by the same reference letters having the numeral 1 prefixed thereto. With this form of apparatus the results which are obtained are exactly similar to those which are obtained by Figure 11, with the exception that the film markings are reversed in such manner that when it is desired to produce any operation the light will be cut off from the mirror which controls the circuit responsible for the production of such operation.

Figure 18:
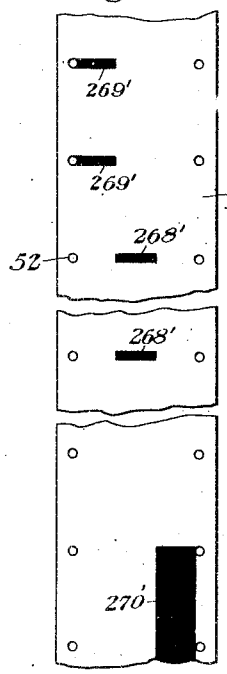
Figures 18, 19 and 20 are views similar to Figures 14, 15 and 16, respectively, but illustrating exactly the reverse of the conditions therein shown.
Figure 19:
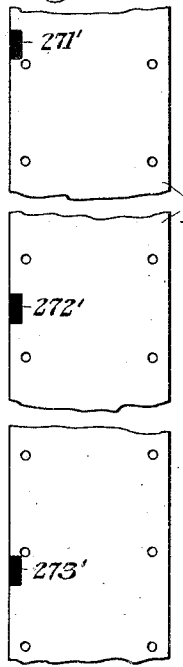

In Figures 15, 16 and 17 there are illustrated different forms of film markings adaptable for use with a circuit of the character illustrated, for example, in Figure 11, while in Figures 18, 19 and 20 there are illustrated film markings which are adaptable, for example, with a circuit of the character illustrated diagrammatically in Figure 21. These figures will now each be described in detail.

In Figure 15 of the drawings there is indicated a section of film in which the adjacent pictures are normally separated by a black line or border 267 which extends continuously from one sprocket opening in one side of the film to the sprocket opening in the opposite side of the film. With such a film construction the mirrors utilized for signaling or other purposes will normally be so positioned that these black lines or borders will prevent the passage of light thereto with a form of circuit as shown, for example, in Figure 11 of the drawings. In case only the mirrors $m$, $m'$ and $m^2$ are utilized, it may be decided to allot the left hand third portion of each black line or border to the control of the mirror $m$, the central third to the control of the mirror $m^2$, and the right hand third to the control of mirror $m^3$. In this construction, when it is desired to change from normal projection in motion to so-called still or stereopticon projection, the central third of the border may be left light to provide a transparent portion 268 in any desired number of frames, which will permit the passage of light rays directly to the mirror $m^2$ for producing the desired operation. At the trailing end of the film the left hand third of each border will be omitted to provide transparent portions 269 through which light rays may be transmitted directly to the mirror $m$ in order to produce the desired rewinding operation, while on the leading end of the film the right hand third of each band or border will be omitted, as indicated, to provide transparent portions 270 permitting the passage of light rays directly to the mirror $m^3$ for again producing normal projection. In types of machines in which the film is not in frame at the conclusion of the rewinding operation, the entire left hand two-thirds of the leader may be blackened to prevent possibility of simultaneous projection of light rays to all of the mirrors.

In Figure 16 of the drawings there is illustrated a modified film arrangement in which one edge of the film is utilized for effecting the desired control. With this construction one edge of the film may have a substantially continuously extending darkened edge to prevent the normal passage of high intensity rays therethrough. The lower third of the edge portion of each frame may be allotted to the mirror $m$, the central third to the mirror $m^2$ and the upper third to the mirror $m^3$. Thus, transparent aperture 271 will permit the passage of light rays to the mirror $m$, transparent aperture 272 will permit the passage of light rays to the mirror $m^2$, while aperture 273 will permit the passage of light rays to the mirror $m^3$.

In Figure 17 there is illustrated still another form of film in which a supplemental portion is provided on one edge of the film for the express purpose of controlling the passage of light to the mirrors provided for controlling purposes. This edge portion may be divided in any desired manner, but it is herein illustrated as divided in a manner similar to that shown in Figure 16, whereby lower transparent portions 274, central transparent portions 275 and upper transparent portions 276 are provided at desired points.

In Figures 18, 19 and 20, respectively, there are shown films corresponding to those shown in Figures 15, 16 and 17, but in which the conditions are exactly reversed, whereby there is provided a film adaptable for use with a circuit as shown, for example, in Figure 21, the films of Figures 15, 16 and 17 being available for use with a circuit of the nature shown in Figure 11. In Figures 18, 19 and 20 the reference characters used correspond respectively to those utilized in Figures 15, 16 and 17 having, however, a prime applied thereto.

In Figure 20' there is illustrated still another form of film adaptable for use in accordance with the present invention. With this arrangement the area within the frames themselves is utilized for control purposes, it being obvious that one or more frames at widely spaced intervals in the film may be easily used for control purposes without interfering with the character of picture shown or the quality of projection. Thus, the areas 277 may be utilized, for example, for controlling the passage of light to a mirror $m$, the portions 278 may be utilized for controlling the passage of light to a mirror $m^2$, the portions 279 may be utilized for controlling the passage of light to mirror $m^4$, and the portions 280 may be utilized for controlling the passage of light to mirror $m^3$. It will be obvious to those skilled in the art that with any of the forms of film shown herein any desired sub-divisioning of the edges, spaces between the pictures, supplemental edge portions, or the picture area itself may be utilized as desired in accordance with the number and arrangement of mirrors provided in the apparatus.

In Figure 28 there is illustrated somewhat diagrammatically one arrangement of mirrors suitable for use, for example, with a film of the arrangement shown either in Figures 15 or 18. In this figure the normal aperture is indicated at 281, this aperture having its lower portion constructed to receive the mirrors $m$, $m^2$ and $m^3$, respectively. It will be obvious that these mirrors, thus positioned, normally extend in direct alignment with the bands or borders between adjacent pictures. In Figure 29 there is illustrated a section taken on the line XXIX—XXIX of Figure 28 for the purposes of illustrating one angular arrangement of the mirrors below the aperture.

In many of the attached claims, the light sensitive element as a matter of brevity and convenience is said to be actuated by "light passed through said predetermined portion of the film" and impinging upon the element. It will of course be understood that the actuation of any light sensitive element follows differences in the light transmitting characteristics of successive correspondingly placed portions of the film. As a matter of literal fact, therefore, the actual control exercised by the light sensitive element may follow either light which is transmitted, or light which is not transmitted. Relative light and dark, in either order, exercise the control. The above quoted phrase and other similar phrases are therefore to be taken to include either condition. It will also be understood that the claims are to be construed in all respects to include light-sensitive elements which are actuated by relative increase of light or relative decrease of light.

The housing H is adapted to contain the combined lighting, resistance and ventilating units, and where desired the resistance 234 provided for the projecting lamp L. This lamp may be adjustably carried within the housing in any desired manner, as by bracket 282 having a pivotal mounting 283 in a bracket 284. Also having a pivotal mounting in the bracket 284 is a reflector R'.

Secured to one side of the housing H is a resistance carrying unit 285 having a suitable resistance for the lamp L. Also mounted on the housing, and preferably exteriorly thereof, is a second resistance 286 with which cooperates a control finger 287 by means of which the resistance may be cut into or out of the motor operating circuit at will.

The housing H at its lower end is preferably in spaced relation to the base B to permit the free circulation of air into the housing, and the top of the housing is closed by a slatted or louvre cover 288 permitting the egress of heated air from the housing. A positive circulation of cooling air through the housing is preferably continuously maintained in such manner as to be effective both on the lamp L and the lamp resistance 285, as well as the lamp resistance 234, where it is positioned within the lamp housing. This circulation may be maintained by means of a fan 289 of suitable construction mounted in the fan casing 290 and driven by an extension 291 of the armature shaft of the motor M.

In Figure 30 there is shown a slightly modified form of aperture in which light sensitive elements, such as the elements 170, 181, 207, 260 and 264 may be directly placed so as to be acted upon directly by the light rays without the necessity of providing an intervening mirror as heretofore set forth. This arrangement may be generally similar to that shown, for example, in the patent to Jenkins No. 1,348,566 of August 3, 1920, but differing therefrom in not having each cell extend the full width of the aperture, whereby a number of cells may be utilized.

In Figures 27 and 27' of the drawings, there is illustrated a modified mechanical embodiment of the invention which has been found to be desirable in many cases where light is utilized for controlling the character or speed of operation of an apparatus of the general nature herein contemplated, or incidental operations of value in connection therewith. With the form of apparatus heretofore described, the shutter 68 was positioned at the extreme front of the apparatus in advance of the objective lens. With such a shutter arrangement, there is no means for practically cutting off light from the light sensitive elements, or the mirrors which control such elements during the periods of travel of the film to bring a new frame into position. With a shutter located as before described, the desired operation must be obtained by reason of the difference in time devoted respectively to projection and to film movement. Ordinarily, the ratio is about four to one, the greater time obviously being available for projection purposes.

In the embodiment illustrated in Figures 27 and 27', however, the shutter 68' is located intermediate the gate section 42' and the objective lens holder 292, so that light from the projecting lamp is cut off from the objective lens during periods of movement thereof. This modified shutter mounting may be provided by providing a casting 293 adapted to be secured directly to one side of a main frame F', and having a shaft receiving extension 294 passing through an opening 295 in the frame. Mounted in the extension 294 is a shaft 296 carrying at one end a spiral gear 297 adapted to mesh with a similar gear 298 on the shaft 56', corresponding to the shaft 56 before described. The opposite end of the shaft 296 extends into an enlargement 299 and is provided with a spiral gear 300 meshing with a similar gear 301 on a longitudinally extending shaft 302. The shaft 302 at one end carries the shutter 68' which may be secured in position by the driving disk 303. The casting 293 may have a curved recess 304 adapted to receive the objective lens holder 292.

Inasmuch as the shaft 56', corresponding to the shaft 56 before described, has its rotation stopped during periods of still projection, film changing or rewinding, it will be apparent that the shutter 68' operates during the same periods as those previously referred to.

In Figure 31 there is illustrated, more or less diagrammatically, a modified embodiment of the present invention, by means of which the tension of the film may be utilized, for example, for obtaining a reversal in the direction of film travel. As indicated herein, the upper brake lever 88', which may be of a construction generally similar to that heretofore described, is adapted in its lower position to engage a contact 305. This contact may be connected by a wire 306 to one side of a suitable source of electric current, the opposite side of which is connected to one terminal of the solenoid 169, which is operable for controlling the movement of the parts in such manner as to produce a normal movement of the film in a feeding direction for projection purposes. The opposite side of the solenoid is connected by a wire 307 to a suitable point on the lever 88'. By reason of such a construction, when the rewinding of the film is completed, the tension created in attempting to pull the film from the lower reel or carrier will be effective for swinging the brake lever 88' downwardly and into engagement with the contact 305. This will automatically result in a reversal of the direction of travel of the film, as will be apparent.

If desired, the lever 88' may cooperate with a circuit 307' including any desired means the circuit to which it is desired to break when the lever moves downwardly under the film tension. The circuit 307' might, for example, include the motor in cases where cessation of motor operation under predetermined film tension was desirable. Likewise, the lever 88' instead of closing a circuit to the solenoid 169 might close a circuit to other means as indicated diagrammatically at M'.

In Figure 32, we have illustrated, more or less diagrammatically, a construction in which the cessation of motor operation, obtained, for example, in a manner as hereinbefore set forth, will be effective for performing certain operations, such as moving the parts of the apparatus to inoperative position at station S2. This may be accomplished by providing the driving shaft 21 with a centrifugally operated switch 308. This switch may comprise a disk movable axially of the driving shaft, and normally urged to the left, as viewed in Figure 32, by a compression spring 309, movement in the opposite direction being effected by centrifugally operated means 310, as well understood. By reason of this construction, so long as rotation of the shaft 21 continues, the disk will be moved to the right in position to the spring 309, and out of engagement with the contacts 311 and 312, respectively. In the event that the shaft 21 ceases rotation, the disk will move to the left and establish a circuit through the coil 314, as will be apparent from the drawings, thereby automatically effecting movement of the parts to station S2. It will be apparent that a centrifugally operated switch of this general character might be utilized for obtaining any other desired control.

Throughout the foregoing description, reference has been made to projecting apparatus. It will be apparent, however, that many portions of the apparatus are inherently capable of use for regular photographic purposes in the taking of pictures.

Certain advantages of the present invention arise from the provision of an apparatus for the repetition display of a length of film in which the desired operating cycles are obtained automatically by light under such conditions that the possibility of injury to the film by heat or extra load is materially minimized.

Other advantages arise from the provision of a light control in apparatus of the general nature herein contemplated effective automatically for determining the character of film movement, the direction of film movement, the speed of operation of the parts prior to and after each change in operating conditions, as well as incidental control operations.

Further advantages arise from the improved means for controlling the light effective on a film entirely by light from the film, whereby during periods of still projection, film changing or rewinding, the amount of light reaching the film is reduced.

Still other advantages arise from the provision of improved control means actuated by light and effective for automatically obtaining any desired condition of operation or control of a photographic apparatus.

Still a further advantage of the present invention resides in its adaptability to the operation and/or control of associated circuits, devices or the like.

We claim:

1. In a film handling apparatus, a delivery member, a taking-up member, an intermittently moving means for feeding a film between said delivery member and said taking-up member, means for compensating for the difference in character of movement of the film between said members and said feeding means, mechanism for moving said compensating means into operative engagement with the film, a source of light for cooperation with the film, and means actuated by such light from the film for actuating said mechanism.

2. In a film handling apparatus, a delivery member and a taking-up member between which a film extends, an intermittent feeding means engaging the film between said members, means movable to an operative position for compensating for the difference in character of movement of said members and said feeding means, mechanism for moving said compensating means to said operative position, a source of light for cooperation with the film, and means responsive to light from the film for actuating said mechanism at predetermined times.

3. In a film handling apparatus, the combination of a film having a predetermined portion of a degree of translucency different from that of corresponding portions thereof, and a delivery member, a taking up member, an intermittently moving means for feeding the film between said delivery member and said taking up member, a source for passing light through the film as it is being fed, means for compensating for the difference in character of movement of said members and said feeding means, operable mechanism for removing said compensating means and the film from operative contact one with the other, and means actuated by light from said source passed through said predetermined portion of the film for operating said mechanism.

4. In a film handling apparatus, a continuously operating film supporting member, a member for intermittently moving the film supported by said continuous member, a source for passing light through the film, a first source of power for driving said intermittent member, means for compensating for the difference in character of movement of said members, operable control mechanism for rendering said compensating means effective upon the film, a second source of power for said mechanism, and means controlled by light from said source passed through a portion of the film having a degree of translucency differing from that of other portions of the film for applying said second source of power to said operable control mechanism whereby said mechanism is operated, said film being formed with such a portion.

5. In a film handling apparatus, a continuously operating delivery support, a continuously operating take-up support, means for feeding a film intermittently in a projecting direction from said delivery support toward said take-up support for projecting pictures therefrom, a source for passing light through the film, operable means for compensating for the difference in character of movement of said delivery support, said take-up support, and said intermittent feeding means during normal intermittent projection, means for feeding the film continuously in the other direction for rewinding the film, means for rendering said compensating means operable upon the film, and means actuated by light from said source passed through a portion of the film having a degree of translucency differing from that of other portions of the film as it is moved in the latter portion of said rewinding cycle for actuating said means for rendering said compensating means operative so that during the succeeding projecting cycle the film is subjected to said compensating means, said film being formed with such a portion.

6. In a film handling apparatus, a continuously operating delivery support, a continuously operating take-up support, means for feeding a film intermittently in a projecting direction from said delivery support toward said take-up support for projecting pictures therefrom, a source for passing light through the film, means for compensating for the difference in character of movement of said continuous delivery support said continuous take-up support, and said intermittent feeding means, means for feeding the film continuously in the other direction for the purpose of rewinding the film, means for releasing said compensating means from operation upon the film during said rewinding cycle, and means actuated by light from said source passed through a portion of the film having a degree of translucency differing from that of other portions of the film as it is moved in the latter portion of said projecting cycle for actuating said releasing means, said film being formed with such a portion.

7. In a film handling apparatus, a delivery member, a taking-up member, a single toothed intermittently moving member for feeding a film between said delivery member and said taking-up member, means for compensating for the difference in character of movement of the film between said delivery and take-up members and said feeding member, mechanism for actuating said compensating means, a source of light for cooperation with the film, and means actuated by light passing through a predetermined portion of the film for operating said mechanism.

8. In a motion picture apparatus, two supports for a film, a light cooperating with the film to project the same, means for feeding said film intermittently from one support to the other to project the same, means for compensating for the differences in character of movement of said supports and said intermittently feeding means, means to move said film in the opposite direction between said supports to rewind the same, and a single electrically operable control means which can be operated to successive stations so that said feeding and compensating means are rendered operative or so that said feeding and compensating means are rendered inoperative and said rewinding means operative, light responsive means in the path of light passed through the film from the light source, and means operatively connecting the last named means and the electrically operable means for actuating the same.

9. In a film handling apparatus, a continuously operating film supporting member, an intermittently operating member engaging the film supported by said continuous member for feeding it in relation thereto, a source for passing light between the film, a film controlling member disposed between said continuous member and said intermittent member and bodily movable between a first position, wherein it is disposed upon one side of the path through which the film is normally fed and wherein it is without operative effect upon the film, and a second position, wherein it is disposed upon the other side of such path, the movement of said film controlling member from said first to said second position being effective to lengthen the stretch of the film between said continuous member and said intermittent member, means for moving said film controlling member between said positions, and means responsive to light from said source passed through a portion of the film having a degree of translucency differing from that of other portions of the film as it is fed through said apparatus for actuating said means for moving said film engaging member, said film being formed with such a portion.

10. In a film handling apparatus, a first film supporting member, a second film supporting member, said supporting members being disposed in said apparatus to permit a film being moved between them, means for increasing the length of the stretch of film between said members, a source for passing light through the film, and means controlled by light from said source passing through a portion of said film of a degree of translucency differing from that of other corresponding portions for operating said length increasing means, said film being formed with such a portion.

11. A film handling apparatus, comprising two continuously moving film supporting members between which a film extends, an operable intermittently moving feeding means for moving the film from one of said members and advancing it toward the other thereof, a source for passing light through the film, operable means for initially increasing the length of film between said members for compensating for the differences in character of movement of said members and said feeding means, and means actuated by light from said source passed through a portion of the film having a degree of translucency differing from that of other portions of the film and interconnecting said feeding means and said compensating means for initially rendering said feeding means operative upon the film and for operating said compensating means, said film being formed with such a portion.

12. In a film handling apparatus, in combination a film having a predetermined portion of a degree of translucency differing from that of other and corresponding portions and a first film-supporting member, a second film-supporting member, a film-contacting member movable between a first position wherein it defines one side of a relatively short path for a film between said supporting members and a second position wherein it defines one side of a relatively long path, operable control mechanism for moving said path-defining member from said first position to said second position, means for maintaining said path-defining member in said first position, means for feeding the film from one of said supporting members to the other through said short path while said path-defining member is maintained in said first position, a source for passing light through the film during said feeding operation, and means operated by light passed from said source through said predetermined portion of the film which is being so fed through said short path for operating said control mechanism whereby said path-defining member is moved from said first to said second position.

13. In a film handling apparatus, an openable gate, said gate including a fixed section and a section movable relatively thereto between a first position wherein said movable section is positioned adjacent said fixed section whereby said gate is closed and a second position wherein said movable section is positioned relatively distantly from said fixed section whereby said gate is opened, a support for a film, means for feeding the film between said support and said gate and through said gate between the sections thereof, a film engaging member disposed between said gate and said support and movable between a first position wherein it defines one side of a relatively long path between said support and said gate and a second position wherein it defines one side of a relatively short path therebetween, a source for passing light through the film, control means interconnecting said movable gate section and said film engaging member and effective for moving said gate section between said first and second positions therefor and for moving said film engaging member between said first and second positions therefor, and means actuated by light from said source passed through a portion of the film having a degree of translucency differing from that of other portions of the moving film for operating said control means, said film being formed with such a portion.

14. In a film handling apparatus, an openable gate through which a film is fed, means for moving the film through said gate, a source for passing light through the film, a support for the film, means for guiding and controlling the tension of that section of the film extending between said support and said gate, said guiding and tension-controlling means including a film-engaging member movable from one position adjacent said gate wherein while said gate is open it forms one side of a path in which the film is initially positioned to another position wherein it forms one side of the path through which the film is fed while said gate is closed, means for opening said gate, and means actuated by light from said source passed through a portion of the film having a degree of translucency differing from that of other portions of the moving film for moving said film-engaging member from one of said positions to the other, said film being formed with such a portion.

15. In a film handling apparatus, two film supports, means for intermittently feeding a film from one of said supports toward the other, said means including a toothed member positioned between said supports and adapted to engage the film, means for separating the film and said toothed member whereby said toothed member and the film are maintained free of engagement, means engaging the film between said intermittent toothed member and one of said supports and movable between one position wherein it defines one side of a relatively short path between said last previously mentioned support and said intermittent toothed member and another position wherein it defines one side of a relatively long path between said last previously mentioned support and said intermittent member, a source for passing light through the film, means for moving said film-engaging path defining means from one of such positions to the other, control mechanism interconnecting said moving means and said means for separating the film and said intermittent feeding member and effective to operate both of the same, and means actuated by light from said source passed through a portion of the film having a degree of translucency differing from that of other portions of the moving film for operating said control mechanism, said film being formed with such a portion.

16. In a film handling apparatus, a continuously operating film supporting member, an intermittent member for intermittently feeding a film in relation to said continuous member, a source for passing light through the film, a path defining member disposed between said continuous member and said intermittent member and movable between a first position wherein a short path is defined between said continuous member and said intermittent member and a second position wherein a long path is defined therebetween, means for moving said path defining member between said first and second positions, mechanism for driving said intermittent member, means for controlling the speed of operation of said driving mechanism, control means for moving said path defining member between said positions and operating said speed controlling means whereby the speed of said intermittent feeding member is controlled in timed relation to the movement of said path defining member, and means actuated by light from said source passed through a portion of the film having a degree of translucency differing from that of other portions of the moving film for operating said control means, said film being formed with such a portion.

17. In a film handling apparatus, a continuously operating film supporting member, an intermittent member for intermittently feeding a film in relation to said continuous member, a source for passing light through the film, a path defining member disposed between said continuous member and said intermittent member and movable between a first position wherein a short path is defined between said continuous member and said intermittent member and a second position wherein a long path is defined therebetween, means for moving said path defining member between said first and second positions, a motor for driving said intermittent member, resistance connectible in the circuit of said motor, means for operating said resistance, control means for moving said path defining member and operating said resistance controlling means, and means actuated by light from said source passed through a portion of the film having a degree of translucency differing from that of other portions of the moving film for operating said control means, said film being formed with such a portion.

18. In a film handling apparatus, a continuously operated film supporting member, an intermittently operated film feeding member, a spring loaded member for controlling the tension of the film between said continuous and intermittent members, means for moving said tensioning member fully into or out of operative engagement with the film, a source for passing light through the film, and means responsive to such light passed through the film for actuating said moving means.

19. In a film handling apparatus, means supporting a film in a slack condition, means for producing and maintaining a predetermined condition of tension upon the film, mechanism for controlling said tension means, a source of light for cooperation with the film, and means actuated by light from said source passed through a predetermined portion of the film for actuating said mechanism.

20. In a film handling apparatus, a source of light, means operable for producing a predetermined condition of tension upon a film, mechanism operable for controlling said means, and light responsive means actuated by light passed through the film from said source for actuating said mechanism at predetermined times.

21. In a film handling apparatus, means for feeding a film, said means including a feeding member, and means for producing a predetermined condition of tension upon the film fed by said member, mechanism for controlling said tension means, a light source for cooperation with the film, and means actuated by light from the film for actuating said mechanism at predetermined intervals.

22. In a film handling apparatus, a source of light, means for maintaining a predetermined condition of tension upon a film, mechanism for rendering said means inoperative upon the film, and light responsive means actuated by light passed from said source through the film effective for actuating said mechanism at predetermined times.

23. In a film handling apparatus, a film supporting member, a member for feeding a film supported by said member, said film having a predetermined portion thereof characterized by a degree of translucency differing from that of other corresponding portions, a source for passing light through the film, a film tensioning member movable between a first work position wherein it subjects to tension the portion of the film extending between said supporting member and said feeding member and a second work position wherein it frees the film from tension and guides the film between said members, control mechanism for moving said film tensioning member from one of said positions to the other, means for maintaining said film tensioning member in either of said work positions after it has been moved thereto, and means including an electrical circuit controlled by light passed from said source through said predetermined portion of the film as it moves between said supporting member and said feeding member for operating said control mechanism.

24. In a film handling apparatus, film moving means, means for producing a predetermined condition of tension upon a film, mechanism for controlling said means effective to render said tensioning means inoperative during rewinding movement of the film in said apparatus, a source arranged to pass light through the film, and means actuated by light which has passed through the film from said source for actuating said mechanism.

25. In a film handling apparatus, means to place a film under a condition of tension throughout its entire unwound length, film feeding means and means to position said film thereon, means to remove said film from said feeding means and means to release the tension thereon in order to facilitate rewinding said film, a light source for cooperation with the film to project the same, and unitary electrically operable means for operating said last two mentioned means, light responsive means in the path of light passed through the film from the light source, and means operatively connecting the last named means and the electrically operable means for actuating the same.

26. In a film handling apparatus, a film supporting member, a first means for moving a film thereto, a second means for moving the film therefrom, braking means for cooperation with said member, control mechanism operatively interconnecting said first and second feeding means and said braking means for rendering said braking means operable and inoperable in accordance with the direction of the movement of the film from or to said supporting member, a source of light for cooperation with the film, and means actuated by light passed from said source through a predetermined portion of the film characterized by a degree of translucency different from that of other correspondingly placed portions of the film for operating said control mechanism, the film being formed with such a predetermined portion.

27. In a film handling apparatus, a film-supporting member, means for moving a film relatively thereto, a source for passing light through the film, braking means for cooperation with said member, said means including a film-engaging member, a braking element cooperating with said film-supporting member, and a connection between said film-engaging member and said braking element whereby said film-engaging member operates said braking element, mechanism for moving said film-engaging member into and out of operative relation with the film, and means actuated by light from said source passed through a portion of the film having a degree of translucency differing from that of other portions of the moving film for operating said mechanism, said film being formed with such a portion.

28. In a film handling apparatus, a member for supporting a film, means for feeding the film supported thereby, a source for passing light through the film, braking means movable to a position wherein it cooperates with said member, mechanism for moving said braking means into such position, and means including a circuit controlled by light from said source passed through a portion of the film having a degree of translucency differing from that of other portions of the film for operating said mechanism, said film being formed with such a portion.

29. In a film handling apparatus, a light source, a rotatable film supporting member, automatic means for controlling the rate of rotation of said member, mechanism for rendering said rotation controlling means operative including means for moving said mechanism into operative relation with the film, and means responsive to light passed through the film from said source for actuating said mechanism.

30. In a film handling apparatus, a film-supporting member, operable means for controlling the rate of rotation of said member, a source for passing light through a film supported upon said member, control mechanism for rendering said rotation-controlling means alternately operable and inoperable upon said film supporting member, and means including a circuit controlled by light from said source passed through a portion of the film having a degree of translucency differing from that of other portions of the film for operating said mechanism, said film being formed with such a portion.

31. In a film handling apparatus, an apertured gate through which a film passes, a source for directing light upon the aperture of said gate, and mechanism effective for opening and closing said gate, and means responsive to light passed through the film from said source for actuating said mechanism to predeterminedly open and close said gate.

32. In a film handling apparatus, a gate comprising a plurality of sections, means for moving a film between two of the sections of said gate, said film having a predetermined portion of a degree of translucency differing from that of other corresponding portions, a source for passing light through said film, mechanism for moving one of said sections relative to another, and means controlled by light passed through said predetermined portion of the moving film from said source for operating said mechanism.

33. In a film handling apparatus, the combination of a film having a portion of a degree of translucency differing from that of other corresponding portions and an openable gate, means for feeding said film through said gate while it is substantially closed, a source for passing light through the film, and means responsive to light passed through said portion from said source for opening said gate.

34. In a film handling apparatus, an openable gate, a first means for feeding a film through said gate while it is substantially closed, a second means other than said feeding means for moving a film through said gate, a source for passing light through the film, guiding means so disposed in relation to said gate and to said first feeding means that the film may be moved by said second moving means through said gate while said gate is open without engaging said first feeding means, and means responsive to light from said source passed through a portion of the film having a degree of translucency differing from that of other portions of the film after the substantial completion of a cycle of movement thereof by said second means for closing said gate, said film being formed with such a portion.

35. In a film handling apparatus, the combination of a film having a portion of a degree of translucency differing from that of other corresponding portions and an openable gate, a source for passing light through the film, means for feeding said film through said gate while it is open, and means responsive to said light from said source passed through said portion for closing said gate.

36. In a film handling apparatus, a gate comprising a plurality of sections, mechanism for moving one of said sections relatively to another, means for feeding a film between said sections, a source for passing light through the film, a first motive means for operating said feeding means, a second motive means for operating said mechanism and means controlled by light from said source passed through a portion of the film having a degree of translucency differing from that of other portions of the film for actuating said second motive means whereby it operates said mechanism, said film being formed with such a portion.

37. In a film handling apparatus, an openable gate including a fixed section and a movable section, means for moving said movable section away from said fixed section for rewinding a film through said gate, means for moving said movable section to operative position adjacent said fixed section for intermittently feeding said film, a source of light cooperating with the film, means responsive to light passed through the film from said source for controlling the operation of said movable gate section, said control means including a reciprocable member, an electric prime mover for moving said reciprocable member in one direction for moving said movable gate section away from said fixed gate section, said control means further including a second electric prime mover for moving said reciprocable member in the other direction to move said movable gate section adjacent said fixed gate section, said control means further including a light responsive element individual to each of said prime movers for actuating the same.

38. The structure described in claim 37, characterized by said prime movers each including a solenoid, one of the solenoids being connected to said reciprocable member to operatively move the same in one direction and the other of said solenoids being connected to said reciprocable member for moving the same in the opposite direction, each of said solenoids being operatively connected to one of the light responsive elements.

39. In a film handling apparatus, a source of light, a gate comprising a plurality of sections, mechanism for moving one of said sections away from and toward another, means for feeding a film therebetween, a source arranged to pass light through the film, means for controlling said mechanism and said feeding means, and means actuated by light which has passed from said source through a predetermined portion of the film for actuating said control means at predetermined times to move said movable section toward and away from the other section and to start and stop said feeding means.

40. In a film handling apparatus, in combination, a film having a predetermined portion of a degree of translucency differing from that of other corresponding portions, a gate comprising a plurality of sections one of which is movable relatively to another, operable mechanism for moving said movable section relatively to another, actuable means for feeding said film through the gate, a source for passing light through the film, control means operatively interconnecting said gate-moving mechanism and said feeding means for operating said gate-moving mechanism and actuating said feeding means, and means controlled by light passed through said predetermined portion of the film from said source for actuating said control means.

41. In a film handling apparatus, a gate comprising a plurality of sections one of which is movable relatively to another, a member for feeding a film between said sections, a source for passing light through the film, means for bringing the film and said feeding member into operative relation one with the other, common operating mechanism for said movable section and said means, means separate from said feeding member for moving the film in relation to said gate, and means actuated by light from said source passed through a portion of the film having a degree of translucency differing from that of other portions of the moving film for operating said mechanism, said film being formed with such a portion.

42. In a film handling apparatus, in combination, a film having a predetermined portion of a degree of translucency differing from that of other corresponding portions, and a first member for feeding said film through a predetermined path, a second member for feeding said film, means for passing light through said film as it is moved by said first feeding member, threading means for moving the film as it is moved by said first feeding member in a direction angular to said path and into engagement with said second member, and means responsive to light from said source passed through said predetermined and other portions of the film for operating said threading means.

43. In a film handling apparatus, a film having a predetermined portion of a degree of translucency differing from that of other corresponding portions, a first member for feeding a film, a second member for feeding the same film, guiding means so disposed in relation to said feeding members that said guiding means create a path through which a film may be moved by said first member past said second member without operative engagement therewith, a source for passing light through said film, means for moving the film, as it is moved past said first member by said second member, in a direction angular to said path and into operative engagement with said second member, and means for operating said last previously above mentioned means, said operating means including an electro-magnet, a circuit therefor, a light responsive element placed upon the side of the film opposite that upon which said light source is disposed and under the influence of light from said source which has passed through said predetermined and other portions of the film and connections between said light responsive element and said electro-magnet for actuating said electro-magnet by the operation of said light responsive element under the influence of said predetermined and other portions.

44. In a film handling apparatus, a toothed feeding member, means for rendering the teeth of said member inaccessible by the film, a source for passing light through the film, and mechanism controlled by light from said source passed through a portion of the film having a degree of translucency differing from that of other portions of the film for actuating said mechanism, said film being formed with such a portion.

45. In a film handling apparatus, a film having a predetermined portion of a degree of translucency differing from that of other corresponding portions, a first member for moving a film, a second toothed member adapted to engage and move the film, a source for passing light through said film, means for rendering the teeth of said moving member inaccessible by the film, control means for rendering said means inoperative whereby the film may be engaged by the teeth of said second member, and mechanism actuated by light passed through said predetermined portion of the film as it is moved by said first member for operating said control means.

46. In a film handling apparatus, an intermittently operable toothed feeding member, means for protecting a film from the teeth of said member, control mechanism for operating said means in predetermined relation to the operation of said feeding member, a source of light for cooperation with the film, and means controlled by light passed to the film from such source for actuating said mechanism.

47. In a film handling apparatus, a member for feeding a film, means for bringing the film into operative relation with said member, mechanism separate from said member for moving the film through said apparatus, a source for passing light through the film, means for rendering said feeding member inaccessible by the film, control mechanism operatively interconnecting both of said means for rendering said means alternately operable, and means controlled by light from said source passed through a portion of the film having a degree of translucency differing from that of other portions of the moving film for operating said control mechanism, said film being formed with such a portion.

48. In a film handling apparatus, a member for feeding a film, a light source cooperating with said member, means operable for bringing the film into operative relation with said member, means operable for bodily removing the film from said member, control mechanism operable for operating either of said means, and means controlled by light passed by said source through predetermined portions of the film effective for operating said control mechanism first to bring the film into operative relation with said feeding member and thereafter to remove the film from said feeding member.

49. Film feeding apparatus comprising a feeding member adapted to engage a film, means for effecting movement of the film in either direction, a source for passing light through the film, means for shielding the film from said feeding member during the movement of the film in one direction, and means actuated by light from said source passed through a portion of the film having a degree of translucency differing from that of other portions of the film for controlling both of said means, said film being formed with such a portion.

50. In combination, a film having a predetermined portion of a degree of translucency different from that of other correspondingly placed portions, and a film handling apparatus, said film handling apparatus including two spaced film supports, means for moving said film in one direction between said supports, means for moving said film in the other direction between said supports, a source for passing light through said film as it is moved between said supports, mechanism operatively interconnected with both of said moving means for rendering said means alternately operative, and means responsive to light passed through said predetermined portion of said film for operating said mechanism.

51. In combination, a film having predetermined portions of a degree of translucency different from that of other correspondingly placed portions, and a film handling apparatus, said film handling apparatus including two spaced film supports, means for moving said film in one direction between said supports, means for moving said film in the other direction between said supports, a source for passing light through said film as it is moved between said supports, mechanism operatively interconnected with both of said moving means for rendering said means alternatively operative, magnetic means for operating said mechanism, electrical means for controlling said magnetic means, a photo-electric cell so positioned as to be within the range of light passed through said portions of the film from said source, and devices connecting said cell and said control means for operating said control means by the fluctuations of current from said cell under the influence of light passed through said predetermined portions and said other portions of said film.

52. In combination, a film having predetermined portions of a degree of translucency different from that of other correspondingly placed portions, and a film handling apparatus, said film handling apparatus including two spaced film supports between which said film extends, a first means for applying power to one of said film supports for revolving it in one direction whereby the film is moved from the other of said supports and wound thereupon, a second means for applying power to the other of said film supports for revolving it in the opposite direction whereby the film is moved from said first mentioned film support and rewound upon said other film support, a source for passing light through said film as it is moved between said supports, said first and second power applying means each including an electro-magnet having a circuit and means for making and breaking said circuit, and means responsive to light passed through said predetermined and other portions for operating said means for making and breaking each of said circuits.

53. In combination, a film having predetermined portions of a degree of translucency different from that of other correspondingly placed portions, and a film handling apparatus, said film handling apparatus including two spaced film supports between which said film extends, means for revolving one of said supports in one direction whereby said film is wound in one direction, means for revolving the other of said supports in the other direction whereby said film is rewound, a source for passing light through said film as it is moved between said supports, mechanism operatively interconnected with both of said revolving means for rendering said means alternatively operative, and means responsive to light passed through said predetermined portions of said film for operating said mechanism.

54. In a film handling apparatus, a rewinding spindle, a clutch for said rewinding spindle, a taking up spindle, a clutch for said taking up spindle, a member for intermittently feeding the film from said rewinding spindle to said taking up spindle, a clutch for said intermittent feeding member, a source for passing light through the film, and electrical means actuated by light from said source passed through a portion of the film having a degree of translucency differing from that of other portions of the film for first rendering said rewinding spindle clutch inoperative and said feeding member clutch operative and said taking up spindle clutch operative whereby the film is fed in a projecting direction through said apparatus and thereafter rendering said taking up spindle clutch inoperative and said feeding member clutch inoperative and said rewinding spindle clutch operative whereby the film is rewound within said apparatus, said film being formed with such a portion.

55. In a film handling apparatus, in combination, a film having predetermined spaced portions of a degree of translucency differing from that of the corresponding intervening portions of the film, and a rewinding spindle, a clutch for said rewinding spindle, a taking up spindle, a clutch for said taking up spindle, means engaging said film between said spindles for advancing the film from said rewinding spindle toward said taking up spindle, a source for passing light through the film, mechanism for first rendering said rewinding spindle clutch inoperative and said taking up spindle clutch operative and thereafter rendering said taking up spindle clutch inoperative and said rewinding spindle clutch operative, a circuit operated by light from said source passed through said predetermined spaced portions of the film for operating said mechanism, and means for rendering said film advancing means inoperative upon the film upon the operation of said mechanism.

56. In a film reel reversing mechanism, a pair of clutches each connectible to a film reel, a film having predetermined portions adjacent its ends each of a degree of translucency differing from that of the correspondingly placed intervening portions, shifting members for each of the clutches interconnected to engage one clutch and disengage the other, a source for passing light through said film, an armature, connections between the armature and shifting members for actuating them from the armature, coils for operating the armature, circuit controlling means for the armature, and means responsive to the light passed through each of said predetermined portions of the film when it is wound off the adjacent reel for operating said current controlling means.

57. In mechanism for winding and rewinding film reels, in combination, a film having a predetermined portion adjacent each end of a degree of translucency differing from that of the intervening correspondingly placed portions, driving mechanism operating in one direction, control means for rendering one of said reels operative and the other inoperative, a source for passing light through said film, means for actuating the control means, said control means comprising a clutch associated with each reel, and means for operating said clutches, said means comprising a primary power source for shifting the clutches, substantially simultaneously operatively to connect one of said clutches with said driving mechanism and disconnect the other clutch, and devices responsive to light passed through said portions adjacent the end of the film for controlling the operation of said primary power source.

58. In a film handling apparatus, a rewinding spindle and a taking up spindle between which a film extends, a clutch for said rewinding spindle, a clutch for said taking up spindle, a light source cooperating with the film, sequential control means connecting said clutches for first rendering said rewinding spindle clutch inoperative, and thereafter rendering said taking up spindle clutch inoperative and said rewinding spindle clutch operative, and means responsive to light from said source passed through the film for actuating said control means.

59. In a film handling apparatus, a rewinding spindle, a clutch for said rewinding spindle, a taking up spindle, a clutch for said taking up spindle, sequential control mechanism for first rendering said rewinding spindle clutch inoperative and said taking up spindle clutch operative and thereafter rendering said taking up spindle clutch inoperative, and a predetermined period after said taking up spindle clutch becomes inoperative rendering said rewinding spindle clutch operative, a source for passing light through the film, and means responsive to light passed from said source through predetermined zones of the film for operating said mechanism.

60. In a motion picture projector, a film having a predetermined portion of a degree of translucency differing from that of other corresponding portions, means for feeding a film in one direction whereby successive images are projected therefrom, means for feeding the film in another direction whereby the film is rewound, mechanism operatively interconnecting both of said feeding means for rendering said means alternately operable, a manually operable movable actuating member, connections between said actuating member and said mechanism for operating said mechanism upon the movement of said actuating member for controlling said mechanism whereby said mechanism may be operated at will, automatic control means, means operable by light from said source passed through said predetermined and other portions of said film for actuating said control means in accordance with such differences of translucency, and connections between said control means and said mechanism for operating said mechanism upon the actuation of said control means whereby said mechanism is operated predeterminedly.

61. In a film handling apparatus, a source for passing light through the film, a first means for feeding a film in one direction, a second means for feeding a film in the other direction, actuable control means interconnecting said first and second feeding means and effective for rendering said first feeding means inoperative and said second feeding operative and assuring a predetermined period between the cessation of operation of said first means and the beginning of operation of said second means, and means controlled by light from said source passed through a portion of the film having a degree of translucency differing from that of other portions of the moving film for actuating said control means, said film being formed with such a portion.

62. In a film handling apparatus, mechanism for causing a film to travel in either of two directions, a source for directing light upon the film, driving means for said mechanism, control means for changing the speed of said mechanism intermediate any change in the direction of travel of the film and means responsive to light passing through the film from said source for actuating said control means.

63. In a film handling apparatus, a film having a predetermined portion of a degree of translucency differing from that of other corresponding portions, means for moving said film in one direction, means for moving the film in the other direction, a motor for driving both of said film-moving means, a source for passing light through said film, resistance connectible in the circuit of said motor, operable means for connecting said resistance in said circuit, control means operatively interconnecting both of said film-moving means and said means for connecting resistance in said motor circuit for operating said film-moving means alternately and for operating said means for connecting resistance in said motor circuit in timed relation to such alternations, and means actuated by light from said source passed through said predetermined and other portions for actuating said control means.

64. In a film handling apparatus, a rewinding member for a film, a taking up member for a film, a first source of power, a clutch for operatively connecting each of said members with said source of power, means operatively interconnecting said clutches for operating said clutches alternately, a second source of power for operating said means, a source for passing light through the film, and means actuated by light from said source passed through a portion of the film having a degree of translucency differing from that of other portions of the film for applying said second source of power to said means whereby said means is operated, said film being formed with such a portion.

65. In a motion picture projector, a film having a predetermined portion of a degree of translucency differing from that of other corresponding portions, a rewinding spindle, a rewinding spindle clutch, a taking up spindle, a taking up spindle clutch, a member for feeding a film intermittently from said rewinding spindle to said taking up spindle, a clutch for said member, a source for passing light through said film, mechanism operatively interconnecting said clutches and first effective for rendering said rewinding spindle clutch inoperative and said taking up spindle clutch operative and said feeding member clutch operative whereby the film is projected and thereafter effective for rendering said taking up spindle clutch and said feeding member clutch inoperative and said rewinding spindle clutch operative whereby the film is rewound, manual means for controlling said mechanism at will, and means actuable by light from said source passed through said predetermined and other portions of the film for controlling said mechanism predeterminedly.

66. In a motion picture projector, a rewinding spindle, a rewinding spindle clutch, a taking up spindle, a taking up spindle clutch, a member for feeding a film intermittently from said rewinding spindle to said taking up spindle, a clutch for said member, a source for passing light through the film, mechanism operatively interconnecting said clutches and first effective for rendering said rewinding spindle clutch inoperative and said taking up spindle clutch and said feeding member clutch operative whereby the film is projected and thereafter effective for rendering said taking up spindle clutch and said feeding member clutch inoperative and said rewinding spindle clutch operative whereby the film is rewound, manual means for controlling said mechanism at will, and means including an electrical circuit closed and opened by light from said source passed through a portion of the film having a degree of translucency differing from that of other portions of the film for controlling said mechanism predeterminedly, said film being formed with such a portion.

67. In a film handling apparatus, mechanism for feeding a film in a projecting direction, mechanism for feeding the film in a rewinding direction, a prime mover for driving said mechanism, reversing mechanism for alternately actuating said mechanisms for determining the direction of travel of the film, control means for said reversing mechanism, two prime movers for operating said control means, one of said prime movers operating said control means to make effective said first named feeding mechanism, the other of said prime movers operating said control means to make effective said second named feeding mechanism, means responsive to light for actuating said prime movers, and means determining the speed of operation of said reversing mechanism.

68. In a film handling apparatus, actuable mechanism for feeding a film in a projecting direction, actuable mechanism for feeding the film in a rewinding direction, reversing mechanism for alternately actuating said mechanisms for determining the direction of travel of the film, control means for said reversing mechanism, a source of light, two prime movers for operating said control means, one of said prime movers operating said control means so as to make effective said first named feeding mechanism, the other of said prime movers operating said control means to make effective said second named feeding mechanism, and means responsive to light from said source passed through the film for actuating said prime movers, said control means including reciprocably operable mechanism, said prime movers including two oppositely acting solenoids connected with said reciprocable mechanism for moving it in either direction.

69. In a film handling apparatus, a source of light, mechanism operable for feeding a film in a projecting direction, mechanism for feeding the film in a rewinding direction, a prime mover for driving said feeding mechanisms, reversing mechanism for alternately connecting said mechanisms to said prime mover for determining the direction of travel of the film, control means for said reversing mechanism, two prime movers for operating said control means, one of said prime movers operating said control means to connect said first named feeding mechanism and said first named prime mover, the other of said prime movers operating said control means to connect said second named feeding mechanism and said first named prime mover, and means responsive to light passed through the film for actuating either of said prime movers predeterminedly.

70. In a film projection apparatus, in combination with a light source, actuable mechanism for feeding a film in a projecting direction, actuable mechanism for feeding the film in a rewinding direction, reversing mechanism interlocking said mechanisms for alternately actuating said mechanisms for determining the direction of travel of the film, operable control means for said reversing mechanism, two prime movers for operating said control means, one of said prime movers operating said control means so as to make effective said first named feeding mechanism, the other of said prime movers operating said control means to make effective said second named feeding mechanism, and means responsive to light for actuating said prime movers, said control means including reciprocably operable mechanism, said prime movers including two oppositely acting solenoids connected with said reciprocable mechanism for moving it in either direction, said light responsive means including a separate light responsive element for the light source operatively connected with each of said solenoids for actuating the latter, and means to control the passage of light to the desired light responsive means.

71. In a film handling apparatus, means for feeding a film, a source of power for said means, mechanism for predeterminedly connecting and thereafter disconnecting said means and said source of power, means for actuating said mechanism, a source for directing light upon the film, and means responsive to light from said source passed through said film for controlling said actuating means.

72. In a film handling apparatus, means for feeding a film, a light source for cooperation with the film, control mechanism effective for stopping the operation of said feeding means and then starting the same after a predetermined interval, and means controlled by light from said source passed through said film for actuating said mechanism.

73. In a film handling apparatus, a film supporting spindle, a source of power, a clutch for connecting or disconnecting said spindle and said source of power, a light source cooperating with the film supported by said spindle, means including an electric prime mover for operating said clutch, and means responsive to light passing through the film from said source for actuating said prime mover.

74. In a film handling apparatus, means for feeding a film, a light source cooperating with the film, mechanism for driving said means, a clutch for operatively connecting said feeding means and said mechanism, means for operating said clutch, and means actuated by light passing through the film from said source for predeterminedly rendering said operating means operative and thereafter inoperative.

75. In a film handling apparatus, a first means for feeding a film, a second means for feeding the film, mechanism for driving said second feeding means, control mechanism for rendering said driving mechanism effective upon said second feeding means, and means actuated by light from said source passed through a portion of the film having a degree of translucency differing from that of other portions of the film from said source as the film is being fed by said first feeding means for predeterminedly actuating said control mechanism, said film being formed with such a portion.

76. In a film handling apparatus, means for feeding a film, a light source cooperating with the film, mechanism for driving said feeding means, control mechanism for rendering said driving mechanism ineffective upon said feeding means, and means actuated by light passing through a predetermined signalling portion of the film having a degree of translucency differing from that of other correspondingly placed portions of the film from said source for predeterminedly actuating said control mechanism, said film being formed with such a portion.

77. In a film handling apparatus, a member for moving a film, a source for passing light through the film, a clutch for said film moving member, and mechanism for operating said clutch, said mechanism comprising a first rotatable control member, connection between said first control member and said clutch whereby the rotation of said first control member operates said clutch, a second rotatable control member, connection between said rotatable control members whereby the rotation of said second control member rotates said first control member, and means responsive to light passed through a portion of the film of a degree of translucency different from that of other corresponding portions of the film for rotating said second control member, the film being formed with such a portion.

78. In a film handling apparatus, a member for feeding a film, a continuously operating driving mechanism for said feeding member, a source for passing light through the film, a motor for operating said driving mechanism, a releasable connection between said feeding member and said continuously operating mechanism, resistance connectible in the circuit of said motor, means for connecting said resistance in the circuit of said motor, control means operatively interconnecting said resistance connecting means and said releasable connection for operating both of said means, and means responsive to light passed through a predetermined portion of the film of a degree of translucency different from that of the corresponding portions of the film from said source for operating said control means, the film being formed with such a portion.

79. In combination, a film having two spaced zones of a degree of translucency differing from that of corresponding portions of the film intervening therebetween, and a film handling apparatus including two supports for said film, a member engaging the film between said supports for feeding the film from one of said supports toward the other thereof, a source for passing light through the film, a motor for driving said feeding member, resistance connectible in the circuit of said motor, operating means for connecting said resistance in the circuit of said motor and removing it therefrom, and control mechanism including devices, responsive to light from said source passing through one of said zones, for actuating said operating means for connecting said resistance in the circuit of said motor and devices, responsive to light from said source passing through the other of said zones, for removing said resistance from said circuit.

80. In combination, a film having a predetermined portion of a degree of translucency differing from that of corresponding portions of the film, and a film handling apparatus including two supports for said film, a member engaging the film between said supports for feeding the film from one of said supports toward the other thereof, a source for passing light through the film, a motor for driving said feeding member, resistance connectible in the circuit of said motor, operating means for connecting said resistance in the circuit of said motor, and control mechanism responsive to light passed from said source through said predetermined portion for actuating said operating means.

81. In combination, a film having a predetermined portion of a degree of translucency differing from that of other corresponding portions of the film, and a film handling apparatus including two supports for said film, a member engaging the film between said supports for feeding the film from one of said supports toward the other thereof, a source for passing light through the film, a motor for driving said feeding member, resistance connectible in the circuit of said motor, operating means for disconnecting said resistance from the circuit of said motor, and control mechanism responsive to light passed from said source through said predetermined portion for actuating said operating means.

82. In a film handling apparatus, a member for feeding a film, driving mechanism for said feeding member, operable means for operatively connecting said member and said driving mechanism, a source for passing light through the film, means operable for temporarily reducing the speed of said driving mechanism, and sequential control means interconnecting said speed reducing means and said connecting means for operating said speed reducing means before the operation of said connecting means, and means responsive to light passed through a predetermined portion of the film of a degree of translucency different from that of other corresponding portions of the film from said source for operating said control means, the film being formed with such a portion.

83. In a film handling apparatus, a member for feeding a film, driving mechanism for said feeding member, operable means for operatively connecting said member and said driving mechanism, a source for passing light through the film, means operable for temporarily reducing the speed of said driving mechanism, control means interconnecting said speed reducing means and said connecting means for operating said speed reducing means and operating said connecting means, and means responsive to light passed through a predetermined portion of the film of a degree of translucency different from that of other corresponding portions of the film from said source for operating said control means, the film being formed with such a portion.

84. In a motion picture projector, a light source for cooperation with a film, operable mechanism for moving the film to project or expose the same, operable means for taking up said film, a source of power for said mechanism and said means, an electrically operated sequential control means connecting said mechanism and said taking up means and said source of power, including means for initiating the operation of said projection by applying said source of power to said taking up means, and means for applying said source of power to said moving mechanism and to the initiation of the taking up means, light responsive means in the path of light passed through the film from the light source, and means operatively connecting the last named means and the electrically operated means for actuating the same.

85. In a film handling apparatus, feeding means for a film, driving mechanism for said feeding means, means for bodily removing the film from said feeding means, a source for passing light through the film, sequential control means, interconnecting said driving mechanism and said means for bodily removing the film from said feeding means, for actuating said removing means and a predetermined time thereafter changing the speed of operation of said driving mechanism, and means responsive to light passed through the film from said source for operating said control means.

86. In a film handling apparatus, feeding means for a film, a source of light for cooperation with the film, driving mechanism for said feeding means, means for bodily removing the film from said feeding means, means for changing the speed of operation of said driving mechanism, sequential control mechanism for first operating said speed changing means and thereafter operating said film removing means, and means responsive to light passed from said source through the film for actuating said control mechanism.

87. In a film handling apparatus including a plurality of operable parts, an intermittent feeding member, a source for passing light through the film, a shutter operatively connected to said intermittent member for cooperative movement therewith, means for disconnecting said intermittent member and said shutter from the remainder of the operable parts of the apparatus, means for stopping said intermittent member and said shutter in predetermined relation to the optical axis of said apparatus after they have been disconnected, and control mechanism actuated by light from said source passed through a portion of the film having a degree of translucency differing from that of other portions of the film for operating said stopping means, said film being formed with such a portion.

88. In a film handling apparatus, means for feeding a film intermittently, a member for taking up the film, a source for passing light through the film, a shutter connected to said feeding means for cooperative movement therewith, a source of power, mechanism for disconnecting said feeding means, said shutter and said taking up means from said power, said mechanism including a clutch operable for disconnecting said shutter and said feeding means for said power, a separate clutch operable for disconnecting said taking up member from said power, operable means cooperating with said shutter and said feeding means for stopping said shutter in predetermined relation to the optical axis of said apparatus after the disconnection of said clutches, control mechanism operatively interconnecting said clutches and said means for predeterminedly stopping said shutter and said feeding means and effective for operating said clutches and said means, and means actuated by light from said source passed through a portion of the film having a degree of translucency differing from that of other portions of the film from said source for actuating said control mechanism, said film being formed with such a portion.

89. In a film handling apparatus including a plurality of operable parts, an intermittent feeding member, a shutter operatively connected to said intermittent member for cooperative and timed movement therewith, a source for passing light through the film, means for positively disconnecting said intermittent member and said shutter from the remainder of the operable parts of the apparatus whereby they are freed from the momentum thereof, and means controlled by light from said source passed through a portion of the film having a degree of translucency differing from that of other portions of the film for operating said disconnecting means, said film being formed with such a portion, control means for positively disconnecting said intermittent member and said shutter from the remainder of the operable parts of the apparatus whereby they are freed from the momentum thereof and thereafter for reconnecting said intermittent member and said shutter to said other operable parts, and means actuated by light from said source passed through said portion of the film for operating said control means at predetermined intervals.

90. In a film handling apparatus, an apertured gate, a moving shutter for cooperating with the aperture of said gate, a source for passing light through the film, mechanism for driving said shutter, means for disconnecting said shutter from said driving mechanism, means for reconnecting said shutter and said driving mechanism, means for moving the film past said aperture while the shutter is disconnected, and means actuated by light from said source passed through a portion of the film having a degree of translucency differing from that of other portions of the film as so moved past said aperture for operating said reconnecting means, said film being formed with such a portion.

91. In a film projection apparatus, a light source for illuminating a film, a shutter for obturating the light from said source, powered means for driving said shutter, a clutch operable for connecting and disconnecting said shutter and said driving means, timed controlled means for operating said clutch to hold said shutter disconnected from said driving means for a predetermined period, and means responsive to light passed through the selected parts of the film from said source for actuating said time controlled means at predetermined intervals.

92. In a film handling apparatus, a member for feeding a film, mechanism for driving said member, a light source for cooperation with the film, means for operatively connecting said member and said mechanism whereby said member is driven by said mechanism at a given number of revolutions per minute, means for operatively connecting said member and said mechanism whereby said member is driven by said mechanism at a number of revolutions per minute different from said first mentioned number, control mechanism interlocking both of said connecting means and effective for rendering either of said connecting means operative, and means actuated by light from said source which has passed through the film for actuating said control mechanism.

93. In a film handling apparatus, means for feeding a film, a source for passing light through the film, mechanism for driving said feeding means, a first means for operatively connecting said driving means and said feeding means, said first means being so constructed that said feeding means is driven by said driving mechanism at a speed greater than that of the persistence of human vision, a second means for operatively connecting said feeding means and said driving mechanism, said second means being so constructed that said feeding means is driven by said driving mechanism at a speed less than that of the persistence of human vision, control means operable irrespective of the extent of film fed through said apparatus for rendering said first and second means alternately operable, and means operated by light from said source which has passed through the film for actuating said control means.

94. In a film handling apparatus, means for moving a film therethrough, a source for passing light through the film, mechanism for driving said film moving means, a first means for operatively connecting said driving means and said moving means, said first means being so constructed that said moving means is driven by said driving mechanism at a speed greater than that of the persistence of human vision, a second means for operatively connecting said moving means and said driving mechanism, said second means being so constructed that said moving means is driven by said driving mechanism at a speed less than that of the persistence of human vision, control means for rendering said first and second means alternately operable, means for governing the time of operation of said control means so that a period of dwell is necessarily provided between the alternate operations of said first and second means, and means operated by light from said source which has passed through predetermined zones of the film for actuating said control means, the film being provided with such zones.

95. In a film handling apparatus, means for feeding a film, a source for passing light through the film, said film having predetermined light varying zones, mechanism for driving said feeding means, a first means for operatively connecting said driving mechanism and said feeding means, said first means being so constructed that said feeding means is driven by said driving mechanism at a speed greater than that of the persistence of human vision, a second means for operatively connecting said feeding means and said driving mechanism, said second means being so constructed that said feeding means is driven by said driving mechanism at a speed less than that of the persistence of human vision, control means for rendering said first and second means alternately operable, means operated by light from said source which has passed through said predetermined zones of the film for actuating said control means, and means for timing the intervals between each successive operation of said first and second means irrespective of said zones.

96. In a film handling apparatus, means for feeding a film, a light source cooperating with the film, an electric motor having a circuit for driving said feeding means, and means for controlling the circuit of said motor, said control means including a photo-electric cell disposed under the influence of light from said source and devices for maintaining the circuit of said motor closed while said light source is illuminated and breaking such circuit upon the failure of said light source, said devices including electrical connections with said cell and with said circuit.

97. In a film feeding apparatus, an apertured gate, a light source cooperating with the aperture of said gate, means for feeding a film past the aperture of said gate, an electric motor for driving said feeding means, a circuit for said motor, a switch for said circuit, a light-responsive element so positioned that it receives light from said light source, and means connecting said light-responsive element and said switch for operating said switch upon the failure of said light source.

98. In a film feeding apparatus, an apertured gate, a light source cooperating with the aperture of said gate, means for feeding a film past the aperture of said gate, an electric motor for driving said feeding means, a circuit for said motor, a switch for said circuit, a light-responsive element so positioned that it receives light from said light source, a signal, and means connecting said light-responsive element, said signal, and said switch for operating said switch and said signal upon the failure of said light source.

99. In a film feeding apparatus, an apertured gate, a light source cooperating with the aperture of said gate, means for initially illuminating said light source, means for feeding a film past the aperture of said gate, an electric motor for driving said feeding means, a circuit for said motor, a switch for said circuit, operating means for moving said switch to circuit-closing position whereby said motor is actuated to drive said feeding means, a light-responsive element so positioned that it receives light from said source, and means connecting said light-responsive element and said switch-operating means for operating said switch to close said circuit when said light source is initially illuminated whereby the initial illumination of said light source starts the operation of said apparatus.

100. In a film handling apparatus, a first means for moving a film in one direction, a second and alternatively operable means for moving the film in the other direction, a source for passing light through the film, a film responsive photo-electric cell so positioned as to receive light from said source after it has passed through the film, mechanism cooperating with the operable parts of said film handling apparatus and operated by said cell, protective means for diminishing such light when the film is being moved in one direction by said first means, and means for rendering said diminishing means inoperative while the film is being moved in the other direction by said second means.

101. In a film handling apparatus, a first means for moving a film in one direction, a second means for moving the film in the other direction, control means for rendering said first and second means alternatively operative, a source for passing light through the film, a film responsive photo-electric cell so positioned as to receive light from said source after it has passed through the film, mechanism cooperating with the operable parts of said film handling apparatus and operated by said cell, means for diminishing such light, and an operating connection between said control means and said diminishing means for operating said diminishing means in cooperation with the operation of said control means.

102. In a film handling apparatus, a member for moving a film, means for rendering said member operative to move the film, a source for passing light through the film, a film responsive photo-electric cell so positioned as to receive light from said source after it has passed through the film, mechanism cooperating with the operable parts of said film handling apparatus and operated by said cell, means for diminishing such light, and an operating connection between said means for rendering said member operative to move the film and said diminishing means for operating said means in cooperation one with the other.

103. In a film handling apparatus, a member for moving a film, means for rendering said member inoperative to move the film, a source for passing light through the film, a film responsive photo-electric cell so positioned as to receive light from said source after it has passed through the film, mechanism cooperating with the operable parts of said film handling apparatus and operated by said cell, means for diminishing such light, and an operating connection between said means for rendering said member inoperative to move the film and said diminishing means for operating said means in cooperation one with the other.

104. In a film handling apparatus, two film supporting members, an operable gate disposed therebetween through which the film passes from one of said supporting members to the other, control means for operating said gate, a source for passing light through the film, a film responsive photo-electric cell so positioned as to receive light from said source after it has passed through the film, mechanism cooperating with the operable parts of said film handling apparatus and operated by said cell, means for diminishing such light, and an operating connection between said control means and said diminishing means for operating said diminishing means in cooperation with the operation of said control means.

105. In a film handling apparatus, two continuously operable film supporting members between which a film extends, an intermittent member engaging the film between said continuous members for advancing the film from one toward the other thereof, means for compensating for the difference in character of movement of said continuous and said intermittent members, said compensating means including means for increasing the length of the stretch of the film between said continuous members, control means for operating said compensating means, a source for passing light through the film, a film responsive photo-electric cell so positioned as to receive light from said source after it has passed through the film, mechanism cooperating with the operable parts of said film handling apparatus and operated by said cell, means for diminishing such light, and an operating connection between said control means and said diminishing means for operating said diminishing means in cooperation with the operation of said control means.

106. In a film handling apparatus, two film supporting members, operable guiding mechanism disposed between said supporting members, said guiding mechanism including film contacting members disposable in either a threading or a projecting position, control means for moving said film contacting members between said positions, a source for passing light through the film, a film responsive photo-electric cell so positioned as to receive light from said source after it has passed through the film, mechanism cooperating with the operable parts of said film handling apparatus and operated by said cell, means for diminishing such light, and an operating connection between said control means and said diminishing means for operating said diminishing means in cooperation with the operation of said control means.

107. In a film handling apparatus having an exposure aperture, a first film carrier, a second film carrier, a film extending between said carriers and being fastened to each of them, and means to move a film past said aperture from one of said carriers to the other, a motor for operating said feeding means, a means for directing light upon the film while the film is in registration with said aperture, devices tending to render said motor inoperative, means resisting said devices whereby to maintain said motor operative and means actuated by the failure of said light source to disable said last named means whereby to stop said motor and said film moving means and prevent rupture of the fastening of the film to the carrier from which it is being delivered.

108. Motion picture apparatus comprising a film supporting spindle, a clutch therefor, means for feeding a film in relation to said spindle, a light source for directing light upon the film supported by said spindle, means for decreasing the light from said source effective upon the film, control mechanism operatively interconnecting said clutch and said light decreasing means for rendering said light-decreasing means operative and moving said spindle clutch to operative position, and means controlled by light from said source passed through a portion of the film having a degree of translucency differing from that of other portions of the film for actuating said control mechanism, said film being formed with such a portion.

109. In a film handling apparatus, a member for feeding a film, mechanism for driving said feeding member, means for reducing the speed of operation of said driving mechanism whereby the film is fed at reduced speed, a source for passing light to the film fed by said member, means for reducing the amount of light effective upon the film fed by said member, and control mechanism for operating said speed-reducing means and said light-reducing means whereby the light reaching the film while said film is being fed at reduced speed is lessened, said control mechanism comprising a movable actuating member, connections between said actuating member and both of said means for operating said speed-reducing means and said light-reducing means upon movement of said actuating member, and means controlled by light from said source passed through a portion of the film having a degree of translucency differing from that of other portions of the film for moving said actuating member, said film being formed with such a portion.

110. In a film handling apparatus, a member for feeding a film, said film being provided with longitudinally spaced zones of a degree of translucency differing from that of the portion of the film intervening between said zones, mechanism for driving said feeding member, a motor for operating said mechanism, resistance connectible in the circuit of said motor, a light source for cooperating with said film, means for varying the light from said light source which reaches the film, actuable control mechanism interconnecting said resistance connecting means and said protective means for rendering the latter operative when said resistance is connected in the circuit of said motor, and means controlled by light from said source which passes through said predetermined zones of the film for actuating said control means.

111. In combination, a film having a picture area and a marginal area separate from said picture area, said marginal area being provided with two spaced signaling portions each of a degree of translucency differing from that of the correspondingly placed intervening portions of said marginal area, and a film handling apparatus, said film handling apparatus including means for feeding said film, means for passing light through the picture areas and the marginal areas of said film, means for diminishing the light from said source reaching the film, a first control means for rendering said light-diminishing means operative, means responsive to light from said source passed through one of said signaling portions of said marginal area for operating said first control means, a second control means for rendering said light-diminishing means inoperative, and means responsive to light from said source passed through said other signaling portion of said marginal area for operating said second control means.

112. In a film handling apparatus, means for feeding a film, driving mechanism for said feeding means, means operable for operatively connecting and disconnecting said feeding means and said mechanism, a photo-electric cell, a source for directing light through the film and upon said cell, means for varying the intensity of such light, and control mechanism actuated by said cell interlocking said varying means and said connecting and disconnecting means.

113. In a film feeding apparatus, an aperture, means for feeding film past said aperture, a source for directing light upon the film while at said aperture, means for reducing the heat effective upon said film from said light source, means operable to render said feeding means successively inoperative and thereafter operative and to decrease the heat reaching said film when said feeding means is inoperative, and means responsive to light passed from said source through said film for operating said last previously mentioned means to thereby render said feeding means inoperative and thereafter operative at predetermined intervals of film movement.

114. In a film handling apparatus, a light source for cooperation with the film, means for varying the heat of said light source effective upon the film, means for feeding the film through light from said source, control means including a movable member having a connection with said feeding means and said heat varying means to render said feeding means successively operative and inoperative, and to concomitantly operate said varying means to decrease the heat of said light source when the feeding means is inoperative, and means responsive to light from said source passed through the film for operating said control means at predetermined intervals.

115. In combination, a film having a predetermined portion of a degree of translucency differing from that of other correspondingly placed portions and a film handling apparatus, said film handling apparatus including means for moving a film, a source of light cooperating with the film, means for varying the amount of light reaching the film from said source, control means having connections with said moving means and said light varying means for rendering said moving means inoperative and said varying means operative, a plurality of means for actuating said control means, means responsive to light passed thereto from said source through said predetermined and other portions of said film for operating one of said actuating means, mechanism for connecting one of said actuating means with said control means, mechanism for connecting the other of said actuating means with said control means, and means for locking one of said actuating means in inoperative position while maintaining said other actuating means free to operate so that said actuating means can actuate said control means irrespective of the last previous operation of said control means by the other actuating means.

116. In a film feeding apparatus, means for moving a film past an aperture, a source for directing light upon said film while at said aperture, a shutter for intercepting said light, means to reduce the heat effective upon said film while at said aperture, control means having operative connections with said moving means, said shutter and said heat reducing means, and light responsive control means actuable by light from said source passed through predetermined parts of the film for operating said first mentioned control means for rendering said moving means and said shutter inoperative and said heat reducing means operative.

117. In a film handling apparatus, means for feeding a film, driving mechanism for said feeding means, means for operatively connecting and disconnecting said feeding means and said mechanism, photo-electric cells, a source for directing light through the film and upon said cells, means for varying the intensity of such light, control mechanism interlocking said varying means and said connecting and disconnecting means, and means operated by said cells for actuating said mechanism, said control mechanism being actuable by said cells to effect both the connection and disconnection of said means at predetermined points of the film travel.

118. In a film handling apparatus, means for moving a film therethrough, a first control mechanism for operating said moving means at a given speed, a second and alternatively operable control mechanism for operating said moving means at a speed different from said given speed, a source for passing light through the film, and means actuable by light passed through a portion of the film having a degree of translucency differing from that of other portions of the film from said source while it is being moved under the influence of said first control mechanism for varying the intensity of the light reaching the film from said light source while said moving means is under the influence of said second control mechanism, said film being formed with such a portion.

119. In a film handling apparatus, means for feeding a film, means for reducing the speed of operation of said feeding means, a light source cooperating with the film, means for varying the intensity of the light reaching the film from said source, mechanism, connecting said means for reducing the speed of operation of said feeding means and said varying means, for rendering said varying means operative while the film is being fed at relatively reduced speeds, and means responsive to light passed thereto from said source through the film for actuating said mechanism.

120. In a film handling apparatus, means for feeding a film, sequential control mechanism for said feeding means movable to a projection-in-motion position or a still-picture position, a photo-electric cell, a source for projecting light through the film and onto said cell, means for varying such light reaching said cell from the film, a connection between said control mechanism and said varying means effective to render said varying means operative prior to the movement of said mechanism to such still-picture position, and means actuated by said cell for operatively moving said control mechanism.

121. In a film handling apparatus, means for feeding a film, control mechanism for said feeding means movable to a projection-in-motion position or to a still-picture position, means including a photo-electric cell for actuating said control mechanism, a source for projecting light through the film and onto said cell, a shield adapted for movement to a position between said source and said cell, means for moving said shield to or from such position, and a connection between said mechanism and said moving means whereby said moving means is operated by the movement of said mechanism from said first named position to said second named position.

122. In a film handling apparatus, means for feeding a film, control mechanism for said feeding means movable to a projection-in-motion position or to a still-picture position, a photo-electric cell, a source for projecting light through the film and onto said cell, a shield adapted for movement to a position between said source and said cell, means for moving said shield to or from such position, a connection between said mechanism and said moving means whereby said moving means is operated by the movement of said mechanism from said first named position to said second named position, means for controlling the speed of said control mechanism between said positions, and means actuated by said cell for operating said mechanism.

123. In a film handling apparatus, means for feeding a film, means for rewinding the film, a photo-electric cell, a source for directing light through the film and upon said cell, a shield adapted for movement to a position between said source and said cell, sequential control mechanism interlocking both of said means and said shield and effective for moving said shield into light intercepting position and thereafter actuating said rewinding means or for moving said shield from light intercepting position and actuating said feeding means, and means actuated by said cell for operating said mechanism.

124. In a film handling apparatus, means for feeding a film in one direction, means for feeding the film in another direction, said means being alternately operable, a photo-electric cell, a source for directing light through the film and upon said cell, means for varying the intensity of such light, control mechanism interlocking all of said means, and means operated by said cell for actuating said control mechanism.

125. In a film handling apparatus, means for feeding a film, control mechanism for said feeding means movable to a projection-in-motion position or to a rewinding position, a photo-electric cell, a source for projecting light through the film and onto said cell, means for varying the light reaching said cell from the film, a connection between said control mechanism and said varying means effective for rendering said varying means operative upon the movement of said mechanism to such re-winding position and means actuated by said cell for operatively moving said control mechanism.

126. In a film handling apparatus, a first means for moving a film in one direction, a second means for moving the film in the contrary direction, a light source for cooperation with the film, means for diminishing the light from said source effective upon the film, sequential control mechanism, connecting both of said moving means and said diminishing means and operable for rendering said first moving means operative and said second moving means inoperative and said diminishing means operative, said control mechanism being further operative for rendering said first means inoperative and said second means operative and said diminishing means inoperative, means for operating said control mechanism, and means responsive to light which has passed through predetermined portions of the film from said source for actuating said operating means at predetermined intervals of the film movement.

127. In a film handling apparatus, mechanism for feeding a film in one direction, mechanism for feeding the film in another direction, means operable for operating either of said mechanisms, means rendering said first mentioned means effective irrespective of the extent of film fed at the time, a photo-electric cell, a source for directing light through the film and upon said cell, means for varying the intensity of such light, and means actuable by said cell for controlling said operating means and said light varying means.

128. In a film handling apparatus, a light source, means for moving a film in a feeding direction past said source, means for moving the film in a rewinding direction past said source, means for protecting the film from the heat of said light source, sequential control mechanism for rendering in predetermined relation said feeding means inoperative, said rewinding means operative and said protecting means operative, time controlled means for operating said sequential control mechanism, and a photo-electric cell in the path of light through the film, for actuating said operating means.

129. In a motion picture projector, operable means for moving the film in one direction, operable means for moving the film in another direction, a light source for directing light onto the said film, a screen movable into first position in the path of light from said source to the film wherein it is effective for varying the intensity of light reaching the film from said light source, or into a second position out of such path of light, an electrically operated sequential control mechanism interlocking both of said film moving means and said screen and necessarily effective for maintaining said screen in such first position during the operating of one of said film moving means and in such second position during the operation of the other of said film moving means, light responsive means in the path of light passed through the film from the light source, and means operatively connecting said light responsive means and the electrically operated control mechanism for actuating the same.

130. In a motion picture projector, a light source for cooperation with a film, taking up means for a film, feeding means for said film, means for protecting said film from heat, means bodily to remove the film from said feeding means, an openable gate through which said film passes, means to rewind said film, electrically operated sequential control means which when moved to a first station initiate the operation of said take up and said feeding means and render said heat protective means ineffective, and when removed therefrom to a second station render said feeding and taking up means ineffective and said heat protective means effective, and when moved therefrom to a third station actuate said means to remove said film from said feeding means and open said gate, and when moved to a fourth station initiate the operation of said rewinding means, light responsive means in the path of light passed through the film from the light source, and means operatively connecting the light responsive means and the electrically operated controlled means for actuating the same.

131. In a film handling apparatus, means for feeding a film, means for rewinding the film, a photo-electric cell, a source for directing light through the film and upon said cell, a shield adapted for movement to a position between said source and said cell, control mechanism interlocking both of said means and said shield and effective for moving said shield into light intercepting position and for actuating said rewinding means or for moving said shield from light intercepting position and for actuating said feeding means, means controlled by said cell for actuating said control mechanism, and a time controlled device governing the speed of operation of said control mechanism.

132. In a film handling apparatus having a plurality of operating positions, a plurality of film supporting members between which a film is fed, a source for passing light through the film, a manual control movable at will to any one of said operating positions, a locking means for said control member movable either to operative or inoperative position, and supplemental means controlled by light from said source passed through a portion of the film having a degree of translucency differing from that of other portions of the film for operating said control while said locking means is in inoperative position, said film being formed with such a portion.

133. In a film handling apparatus, means for feeding a film, means for rewinding the film, a photo-electric cell, a source for directing light through the film and upon said cell, a shield adapted for movement to a position between said source and said cell, control mechanism effective for moving said shield into light intercepting position and concomitantly actuating said rewinding means or for moving said shield from light intercepting position and concomitantly actuating said feeding means, and means connecting said cell to said control mechanism for actuating said mechanism, said connecting means including timing devices for controlling the speed of operation of said control mechanism.

134. In a film handling apparatus, a first means for moving a film in one direction, a second and alternatively operative means for moving the film in the opposite direction, a source for passing light through the film, a film responsive photo-electric cell so positioned as to receive light from said source after it has passed through the film, mechanism cooperating with the operable parts of said film handling apparatus and operated by said cell under the influence of light from said source which has passed through the film and impinged upon said cell, automatic means for controlling the operation of said cell while the film is being moved in one direction by said first means, and automatic means for rendering said controlling means inoperative while the film is being moved in the other direction by said second means.

135. In a film handling apparatus, a first means for moving a film in one direction, a second means for moving the film in the other direction, actuating means for rendering said first and second means alternatively operative, a source for passing light through the film, a film responsive photo-electric cell so positioned as to receive light from said source after it has passed through the film, mechanism cooperating with the operable parts of said film handling apparatus and operated by said cell under the influence of light from said source which has passed through the film and impinged upon said cell, means for controlling the operation of said cell, and an operating connection between said actuating means and said cell-controlling means for operating said cell-controlling means in cooperation with the operation of said actuating means.

136. In a film handling apparatus, a member for moving a film, means for rendering said member operative to move the film, a source for passing light through the film, a film responsive photo-electric cell so positioned as to receive light from said source after it has passed through the film, mechanism cooperating with the operable parts of said film handling apparatus operated by said cell under the influence of light from said source which has passed through the film and impinged upon said cell, means for controlling the operation of said cell, and an operating connection between said means for rendering said member operative to move the film and said cell-controlling means for operating said means in cooperation one with the other.

137. In a film handling apparatus, a member for moving a film, means for rendering said member inoperative to move the film, a source for passing light through the film, a film responsive photo-electric cell so positioned as to receive light from said source after it has passed through the film, mechanism cooperating with the operable parts of said film handling apparatus and operated by said cell under the influence of light from said source which has passed through the film and impinged upon said cell, means for controlling the operation of said cell, and an operating connection between said means for rendering said member inoperative to move the film and said cell-controlling means for operating said means in cooperation one with the other.

138. In a film handling apparatus, two films supporting members, an operable gate disposed therebetween through which the film passes from one of said supporting members to the other, means for operating said gate, a source for passing light through the film, a film responsive photo-electric cell so positioned as to receive light from said source after it has passed through the film, mechanism cooperating with the operable parts of said film handling apparatus and operated by said cell under the influence of light from said source which has passed through the film and impinged upon said cell, means for controlling the operation of said cell, and an operating connection between said means for operating said gate and said cell-controlling means for operating said cell-controlling means in cooperation with the operation of said means for operating said gate.

139. In a film handling apparatus, two continuously operable film supporting members between which a film extends, an intermittent member engaging the film between said continuous members for advancing the film from one toward the other thereof, means for compensating for the difference in character of movement of said continuous and said intermittent members, said compensating means including means for increasing the length of the stretch of the film between said continuous members, means for operating said compensating means, a source for passing light through the film, a film responsive photo-electric cell so positioned as to receive light from said source after it has passed through the film, mechanism cooperating with the operable parts of said film handling apparatus and operated by said cell under the influence of light from said source which has passed through the film and impinged upon said cell, means for controlling the operation of said cell, and an operating connection between said means for operating said compensating means and said cell-controlling means for operating said cell-controlling means in cooperation with the operation of said means for operating said compensating means.

140. In a film handling apparatus, two film supporting members, operable guiding mechanism disposed between said supporting members, said guiding mechanism including film contacting members disposable in either a threading or a projecting position, means for moving said film contacting members between said positions, a source for passing light through the film, a film responsive photo-electric cell so positioned as to receive light from said source after it has passed through the film, mechanism cooperating with the operable parts of said film handling apparatus and operated by said cell under the influence of light from said source which has passed through the film and impinged upon said cell, means for controlling the operation of said cell, and an operating connection between said moving means and said cell-controlling means for operating said cell-controlling means in cooperation with the operation of said moving means.

141. In a film handling apparatus, a continuously operating film supporting member, a member for intermittently moving the film supported by said continuous member, a source for passing light through the film, a first source of power for driving said intermittent member, means for compensating for the difference in character of movement of said intermittent and continuous members, operable control mechanism for rendering said compensating means ineffective upon the film, a second source of power for said mechanism, and means responsive to light passed through a portion of the film having a different degree of translucency from that of another portion of the film for applying said second source of power to said operable control mechanism whereby said mechanism is operated, said film being formed with such portions.

142. In a film handling apparatus, a continuously operating film supporting member, a member for intermittently moving the film supported by said continuous member, a source for passing light through the film, a first source of power for driving said intermittent member, means for compensating for the difference in character of movement of said continuous and intermittent members, said compensating means including a member movable between a threading position wherein it defines a relatively short path between said continuous member and said intermittent member and a projecting position wherein it defines a relatively long path therebetween, a second source of power for moving said path defining member from one of said positions to the other, and means controlled by light passed through a portion of the film having a degree of translucency differing from that of another portion thereof for applying said second source of power to said moving means whereby said moving means moves said path defining member from one of said positions to the other thereof, said film being formed with such portions 143. In a film handling apparatus, a first film-supporting member, a second film-supporting member, a film-contacting member movable between one position wherein it defines one side of a relatively short path for a film between said supporting members and another position wherein it defines one side of a relatively long path therebetween, operable control mechanism for moving said path defining member between said positions, a source for passing light through the film, and means for moving the film from one of said supporting members to the other through one of said paths while said path-defining member is maintained in the position appropriate to said path, said operable control mechanism including manual means for moving said path defining member to said last above-mentioned position and means, responsive to light from said source passing through a portion of the film having a degree of translucency different from that of another portion thereof as said film is moved through said last previously above-mentioned path, for moving said path-defining member from said last previously mentioned position to said other position, said film being formed with such portions.

144. In a film handling apparatus, an openable gate through which a film is fed, means for moving the film through said gate, a support for the film, means for guiding and controlling the tension of that section of the film extending between said support and said gate, said guiding means including a film-engaging member movable from one position relatively adjacent said gate wherein while said gate is open it forms one side of a path in which the film is initially positioned to another position wherein it forms one side of the path through which the film is moved while said gate is closed, means for opening said gate, means for moving said film-engaging member from one of said positions to the other, a source for passing light through the film, and means actuated by light passing through a portion of the moving film having a degree of translucency different from that of another portion for moving said film-engaging member from the second above-mentioned position back to the first above-mentioned position, said film being formed with such portions.

WARREN DUNHAM FOSTER.
EARLE L. PARMELEE.